(12) United States Patent
Furumochi et al.

(10) Patent No.: US 10,986,262 B2
(45) Date of Patent: Apr. 20, 2021

(54) IMAGING APPARATUS, CONTROL METHOD, AND NON-TRANSITORY STORAGE MEDIUM

(71) Applicant: CANON KABUSHIKI KAISHA, Tokyo (JP)

(72) Inventors: Hiroyuki Furumochi, Musashimurayama (JP); Yoshihito Tamaki, Yokohama (JP); Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/744,856

(22) Filed: Jan. 16, 2020

(65) Prior Publication Data

US 2020/0154034 A1     May 14, 2020

Related U.S. Application Data

(62) Division of application No. 15/933,550, filed on Mar. 23, 2018, now Pat. No. 10,602,051.

(30) Foreign Application Priority Data

Mar. 28, 2017 (JP) .............................. JP2017-062852
Nov. 10, 2017 (JP) .............................. JP2017-217626
(Continued)

(51) Int. Cl.
  *H04N 5/232* (2006.01)
  *H04N 5/235* (2006.01)
  (Continued)

(52) U.S. Cl.
  CPC ....... *H04N 5/23212* (2013.01); *H04N 5/2352* (2013.01); *H04N 5/2353* (2013.01);
  (Continued)

(58) Field of Classification Search
  None
  See application file for complete search history.

(56) References Cited

U.S. PATENT DOCUMENTS

2011/0149111 A1    6/2011  Prentice et al.
2012/0105673 A1*   5/2012  Morales ................. H04N 5/347
                                                    348/229.1
(Continued)

FOREIGN PATENT DOCUMENTS

CN    102801929 A    11/2012
CN    104580921 A     4/2015
(Continued)

OTHER PUBLICATIONS

The above foreign patent document was cited in a Apr. 17, 2020 Chinese Office Action, which is enclosed with an English Translation, that issued in Chinese Patent Application No. 201810263642.9.

(Continued)

*Primary Examiner* — Mark T Monk
(74) *Attorney, Agent, or Firm* — Cowan, Liebowitz & Latman, P.C.

(57) ABSTRACT

According to an aspect of the invention, as imaging apparatus includes a first control unit configured to control exposure parameters of an imaging element, and a second control unit configured to perform processing of switching between and outputting a first image corresponding to pixel portions of a number of first pixels and a second image corresponding to pixel portions of a number of second pixels smaller than the number of first pixels among pixel portions of the imaging element. The second control unit performs focusing determination on the basis of at least one of the first image and the second image.

10 Claims, 22 Drawing Sheets

(30) Foreign Application Priority Data

Nov. 10, 2017 (JP) .............................. JP2017-217627
Jan. 29, 2018 (JP) .............................. JP2018-012590

(51) Int. Cl.
  *H04N 9/04* (2006.01)
  *H04N 5/225* (2006.01)
  *H04N 5/353* (2011.01)
  *H04N 9/64* (2006.01)

(52) U.S. Cl.
  CPC ....... *H04N 5/2357* (2013.01); *H04N 5/23245* (2013.01); *H04N 5/23267* (2013.01); *H04N 5/23293* (2013.01); *H04N 5/232122* (2018.08); *H04N 5/353* (2013.01); *H04N 9/045* (2013.01); *H04N 9/64* (2013.01)

(56) References Cited

U.S. PATENT DOCUMENTS

| | | | |
|---|---|---|---|
| 2012/0194705 A1* | 8/2012 | Yoshida | H04N 5/235 348/238 |
| 2012/0269444 A1 | 10/2012 | Naito | |
| 2014/0333823 A1 | 11/2014 | Sakaguchi | |
| 2014/0375838 A1 | 12/2014 | Shimoozono et al. | |
| 2015/0124153 A1 | 5/2015 | Hamada | |
| 2016/0182795 A1 | 6/2016 | Kosaka | |
| 2016/0337578 A1 | 11/2016 | Kikuchi | |
| 2016/0366355 A1 | 12/2016 | Kato | |

FOREIGN PATENT DOCUMENTS

| | | |
|---|---|---|
| JP | 2007-067708 A | 3/2007 |
| JP | 2007-174574 A | 7/2007 |
| JP | 2010-226185 A | 10/2010 |
| JP | 2015-144346 A | 8/2015 |

OTHER PUBLICATIONS

The above U.S. Patent Patent Application Publication document #1 was cited in a European Partial Search Report dated Aug. 2, 2018, which is enclosed, that issued in the corresponding European Patent Application No. 18163888.3.

The above U.S. Patent Patent Application Publication documents #2-5 were cited in a European Partial Search Report dated Dec. 13, 2018, which is enclosed, that issued in the corresponding European Patent Application No. 18163888.3.

The above foreign patent documents #2-3 were cited in the Sep. 24, 2019 Japanese Office Action, which is enclosed without an English Translation, that issued in Japanese Patent Application No. 2018-012590.

The above foreign patent documents were cited in a Apr. 17, 2020 Chinese Office Action, which is enclosed with an English Translation, that issued in Chinese Patent Application No. 201810263642.9.

The above foreign patent documents were cited in the Aug. 11, 2020 Japanese Office Action, which is enclosed with an English Translation, that issued in Japanese Patent Application No. 2019-229078.

* cited by examiner

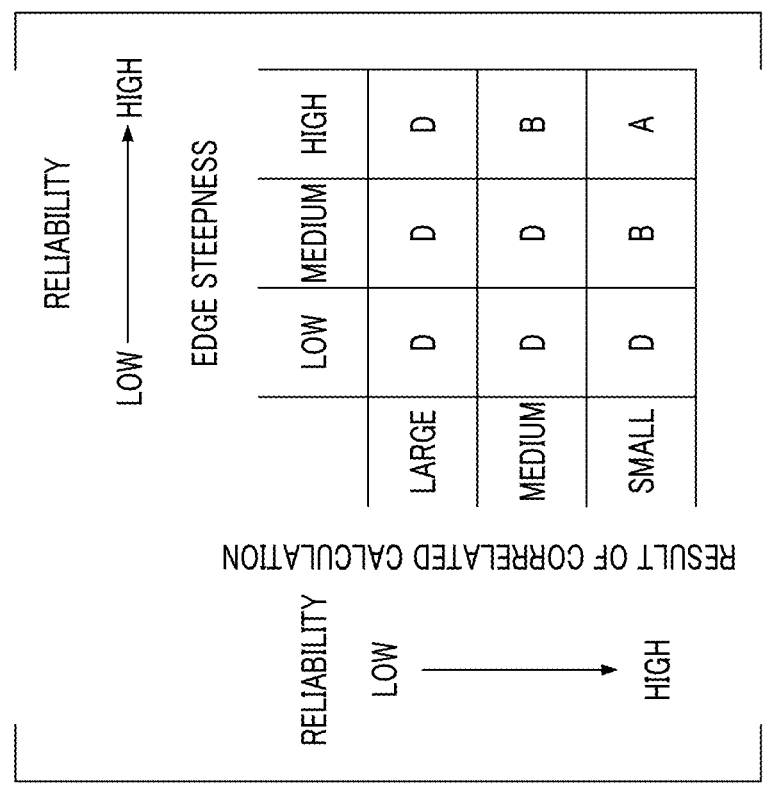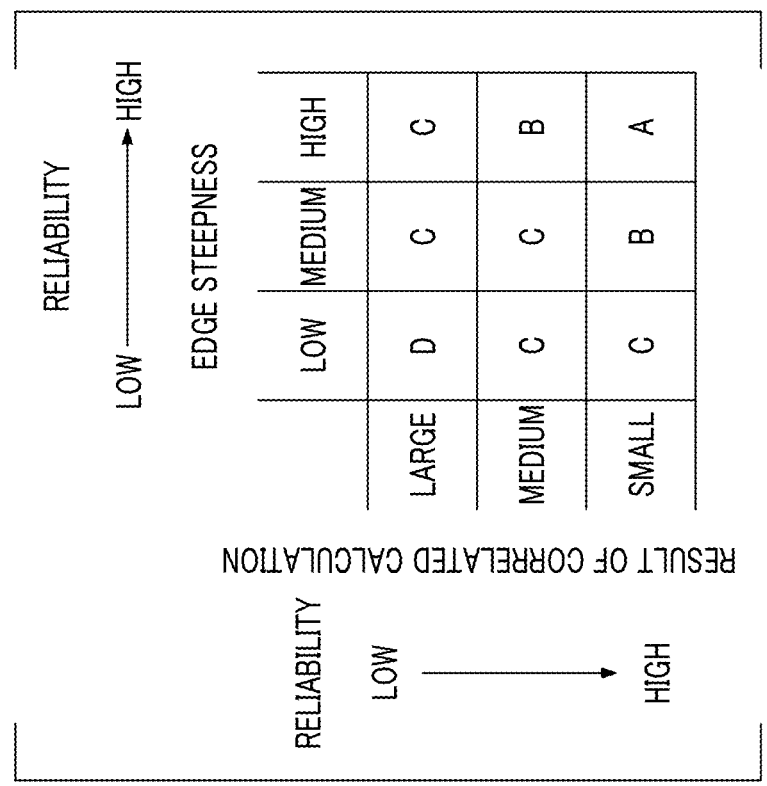

IMAGING APPARATUS, CONTROL METHOD, AND NON-TRANSITORY STORAGE MEDIUM

CROSS-REFERENCE TO RELATED APPLICATION

This application is a divisional of application Ser. No. 15/933,550, filed Mar. 23, 2018, the entire disclosure of which is hereby incorporated by reference.

BACKGROUND OF THE INVENTION

Field of the Invention

The present invention relates to an imaging apparatus, a control method, and a storage medium.

Description of the Related Art

Among imaging apparatuses such as digital cameras, there is an imaging apparatus having a continuous shooting (continuous photographing) function of performing continuous still image photographing while performing automatic focus detection (imaging plane phase difference AF) with an imaging plane phase difference method on a main object. During execution of this continuous shooting function, the imaging apparatus reads each of images to be displayed as live view (LV) images on a back monitor or the like and recorded images to be recorded as still images, and performs display and recording of the images in real time.

For example, a technology for improving the followability with respect to a main object when an image acquired from the imaging element is displayed on a display device as a live view image (LV image) while performing focus detection during continuous shooting is known. In Japanese Unexamined Patent Publication No. 2015-144346, a technology which switches between whether to sequentially display images of different resolutions or only high resolution images on a display device has been proposed. According to Japanese Unexamined Patent Application Publication No. 2015-144346, even in continuous shooting with a low frame rate, it is possible to improve the followability with respect to a main object at the time of framing by shortening the display time interval of LV images.

However, according to the technology proposed in Japanese Unexamined Patent Application Publication No. 2015-144346, when images having different resolutions are sequentially displayed on a display device, a difference in image quality in accordance with a difference in exposure between images having different resolutions or a difference in signal reading conditions is not mentioned. If a difference in image quality between images occurs due to reasons as described above, images having different brightness, resolution, contrast, and the like are alternately displayed, and thus an unnatural display is brought, about which causes a feeling of discomfort for a user. In this case, there is a problem that the feeling of discomfort given to a user becomes great due to alternately displaying images.

SUMMARY OF THE INVENTION

The present invention provides a technology for reducing an unnatural feeling given to a user when different types of image are acquired at the time of continuous photographing and these images are displayed.

According to an aspect of the invention, an imaging apparatus that images an object through an imaging optical system, the imaging apparatus comprising: an imaging element which acquires image signals from light imaged by the imaging optical system; a first control unit configured to control exposure parameters of the imaging element; and a second control unit configured to perform processing of switching between and outputting a first image corresponding to pixel portions of a number of first pixels and a second image corresponding to pixel portions of a number of second pixels smaller than the number or first pixels among pixel portions of the imaging element. The second control unit performs focusing determination on the basis of at least one of the first image and the second image. The first control unit reduces an amount of changes in exposure parameters of continuously acquired first and second images by controlling exposure parameters for acquiring the first image and the second image.

Further features or the present invention will become apparent from the following description of exemplary embodiments with reference to the attached drawings.

BRIEF DESCRIPTION OF THE DRAWINGS

FIGS. 10A and 10B are diagrams which show focusing determination tables in a second embodiment.

DESCRIPTION OF THE EMBODIMENTS

Hereinafter, the embodiments of the present invention will be described. Each embodiment describes an imaging apparatus which includes an imaging element having pupil-divided focus detection pixels, and performs continuous photographing (AF continuous shooting) while focusing on an object. Even if the aperture value is changed at the time of still image photographing in the continuous photographing, the aperture is controlled such that a difference between the aperture value and the aperture value at the time of live view photographing decreases, and thereby it is possible to curb deterioration of followability during framing while maintaining display quality.

First Embodiment

Figure 1:
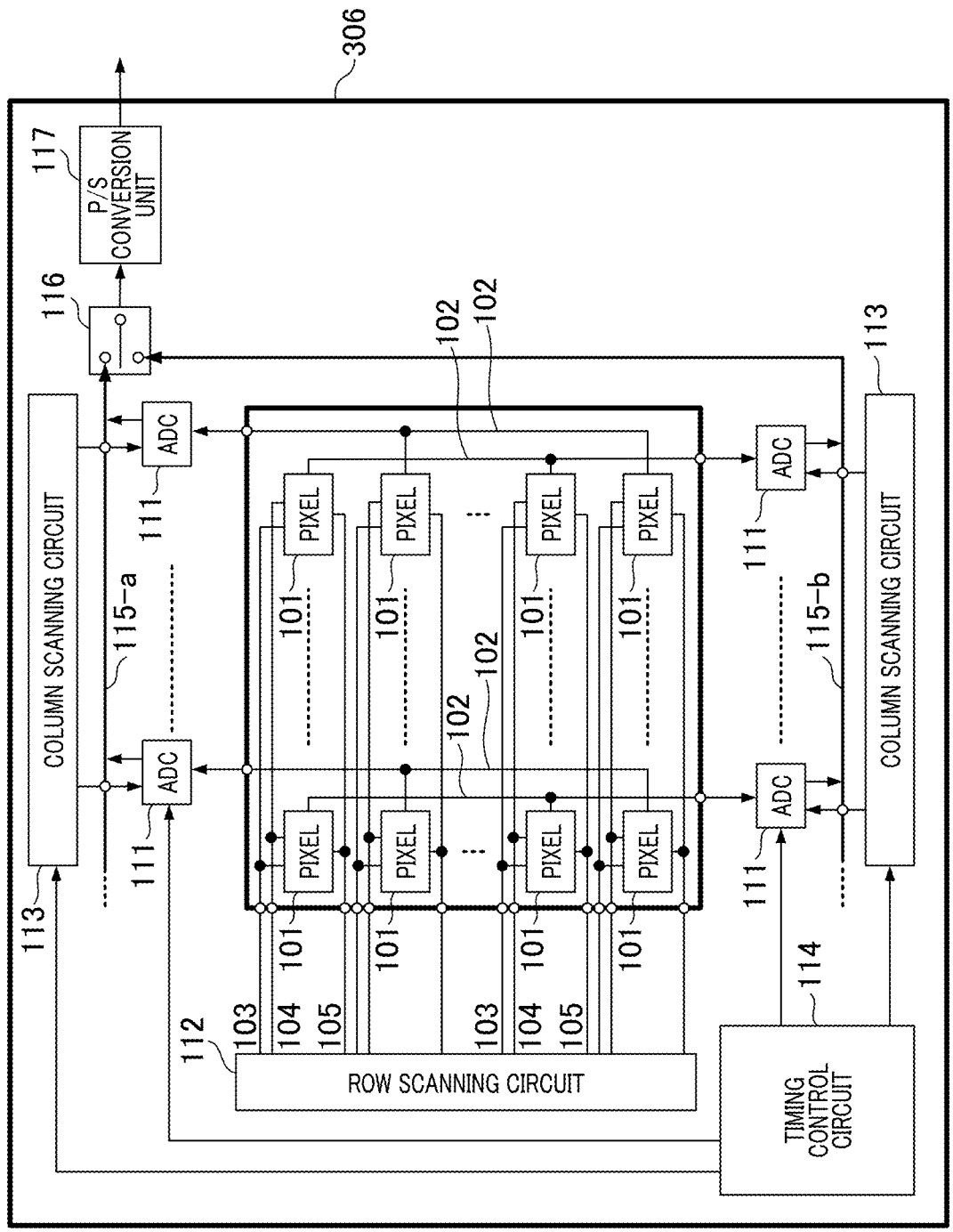
FIG. 1 is a schematic structural diagram of an imaging element in an embodiment of the present invention.

FIG. 1 is a schematic block diagram which shows a configuration example of an imaging element in a first embodiment of the present invention. An imaging element 306 has a configuration in which a large number of pixel portions 101 are arranged in a two-dimensional array shape. Each of a vertical output line 102, a transfer signal line 103, a reset signal line 104, and a row selection signal line 105 is connected to each of the pixel portions 101. A column ADC block 111 outputs a signal obtained by performing an analog to digital (A/D) conversion on a signal output from the vertical output line 102 connected to the pixel portion 101. A row scanning circuit 112 is connected to the pixel portion 101 by the transfer signal line 103, the reset signal line 104, and the row selection signal line 105. A plurality of column scanning circuits 113 are connected to a plurality of column ADC blocks 111 by horizontal signal lines 115-a and 115-b. A timing control circuit 114 outputs a timing control signal to each of the column ADC block 111 and the column scanning circuit 113 and performs control.

A switching unit 116 switches respective signals of the horizontal signal lines 115-a and 115-b, and outputs the signals to a parallel to serial conversion unit (hereinafter, referred to as a P/S conversion unit) 117. The P/S conversion unit 117 acquires the output of the switching unit 116, and performs a parallel to serial conversion. The P/S conversion unit 117 outputs a converted signal to the outside.

In the imaging element 306 of the present embodiment, the plurality of pixel portions 101 are connected to the transfer signal lines 103, the reset signal lines 104, and the row selection signal lines 105 in a horizontal direction (a row direction), and are connected to the vertical output lines 102 in a vertical direction (a column direction). Each of the vertical output lines 102 has a different connection destination in accordance with a read row unit. Signals read from the pixel portion 101 are output from the horizontal signal line 115-1 and the horizontal signal line 115-b of each channel via the column ADC block 111, and are sent to the switching unit 116. Image signals selected by the switching unit 116 are objected to a parallel to serial conversion by the P/S conversion unit 117 in accordance with a timing of the timing control circuit 114, and output outside of the imaging element 306.

As a method of reading pixel signals, it is possible to appropriately select a method of reading all pixels, a method of thinning out and reading pixels in a vertical direction, a method of adding and reading pixels in a horizontal direction, a method of vertical thinning and horizontal adding, or the like. The method of vertical thinning and horizontal adding is a method in which thinning-reading is performed in a vertical direction and pixels are added and read in a horizontal direction. The method of reading all pixels is adopted as the method of reading a still image in the present embodiment. In a first read mode, pixel signals are read from all pixel portions of an imaging element as pixel portions corresponding to a number of first pixels. Since the number of pixels to be read is large, only a limited number of images can be acquired within a predetermined period of time, and thus, when an object that is a moving object moves at high speed, it is difficult to accurately capture the object within an angle of view. On the other hand, the method of vertical thinning and horizontal adding is adopted as a live view reading method. In a second read mode, pixel signals are read based on pixel portions corresponding to the number of second pixels which is smaller than the number of first pixels among the pixel portions of the imaging element. Since the number of pixels to be read is small, this is suitable for speeding up processing.

Figure 2:
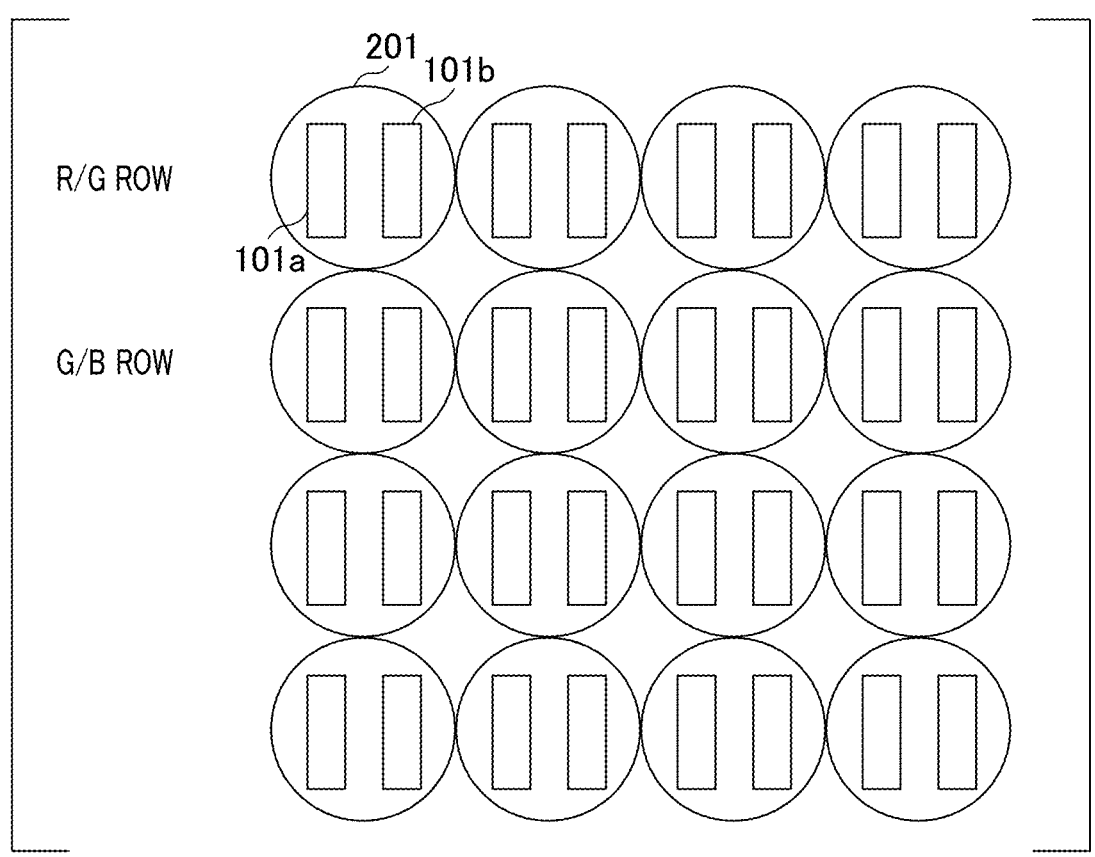
FIG. 2 is a pixel arrangement diagram of imaging elements in the embodiment of the present invention.

FIG. 2 schematically shows the pixel arrangement of the imaging element 306 used in an imaging plane phase difference AF in the present embodiment. The imaging element 306 has a configuration in which a plurality of photoelectric conversion units corresponding to the on-chip microlens 201 are arranged. A Bayer array is applied to color filters, and red (RED) and green (GREEN) color filters are alternately provided in order from the left in pixels of odd-numbered rows indicated by R/G rows. Moreover, green (GREEN) and blue (BLUE) color filters are alternately provided from the left in pixels of even-numbered rows indicated by G/B rows. The on-chip microlens 201 is configured to be on the color filter. A plurality of photoelectric conversion units arranged inside the on-chip microlens 201 are indicated by a plurality of rectangles. The photoelectric conversion units paired with the pupil-division type imaging elements are denoted as an A pixel 101a and a B pixel 101b, respectively. An A image which is a first viewpoint image is generated by an output from the A pixel 101a included in a first pixel group. A B image which is a second viewpoint image is generated by an output from the B pixel 101b included in a second pixel group. The calculation unit detects an amount of relative image shift between the A image and the B image by correlation calculation, and calculates an amount, of defocus in a predetermined region. A focus lens moves and the focus adjustment operation of the lens unit 301 is performed on the basis of the amount of defocus. In addition, the signal of the A image and the signal of the B image are added within the imaging element, and image signals for display and recording are generated. As shown in FIG. 2, instead of adopting a pixel configuration in which a plurality of photoelectric conversion units are provided, a configuration may be adopted in which a part of the light receiving surface of the photoelectric conversion unit is shielded from light.

Figure 3:
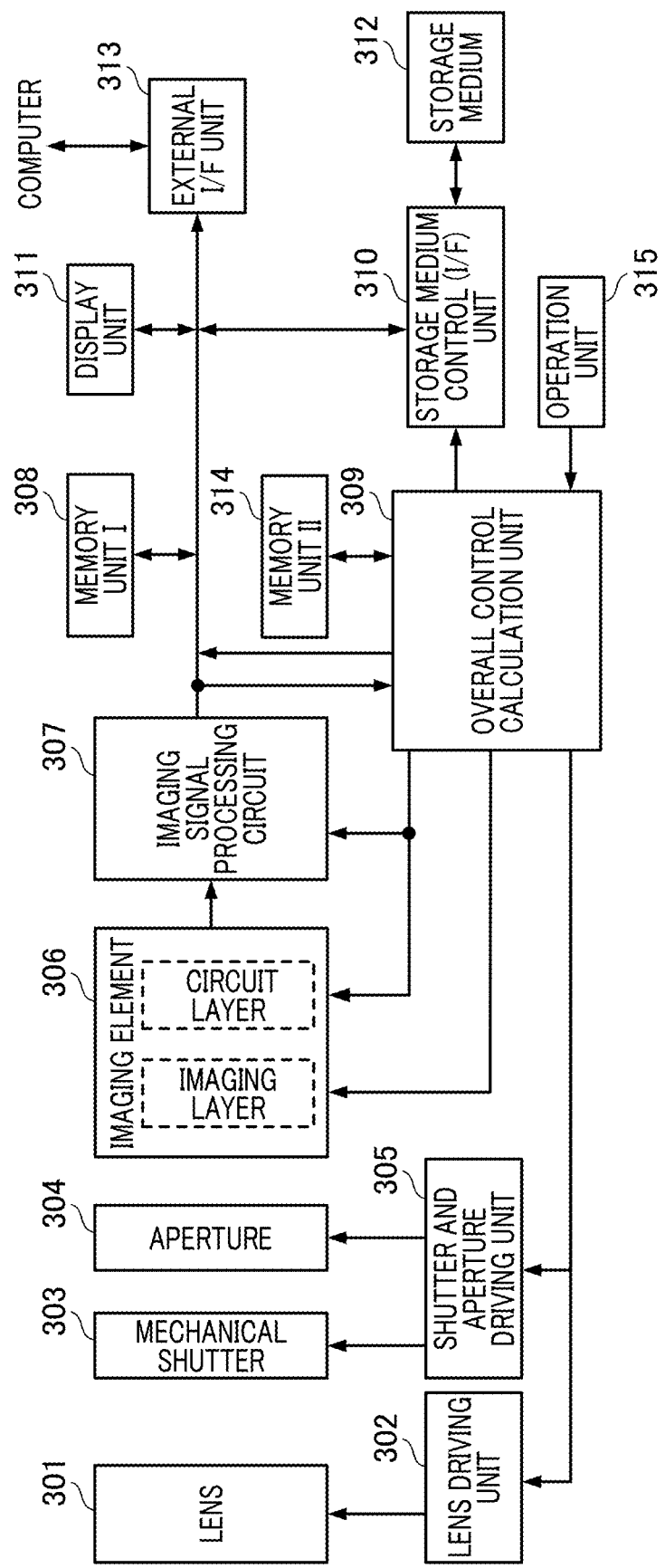
FIG. 3 is a schematic diagram of an imaging system in the embodiment of the present invention.

FIG. 3 is a block diagram which shows an outline of an imaging system using the imaging element 306. As an example of the imaging system of the present embodiment, there is a digital camera which acquires a moving image or a still image, but the present invention is not limited thereto. For example, this can be applied to mobile devices such as monitoring cameras and smart phones, and moving objects such as in-vehicle cameras.

The lens unit 301 includes a plurality of lenses constituting an imaging optical system. The lens unit 301 is an interchangeable lens which can be attached to a camera main body or a lens unit integrated with the camera main body. A lens driving unit 302 drives a movable lens (zoom lens, focus lens, and the like) constituting an imaging optical system. A mechanical shutter (denoted as a mechanical shutter in FIG. 3) 303 is used for controlling an exposure time, and an aperture 304 is used for controlling an amount of exposure. A mechanical shutter and aperture driving unit (denoted as a shutter and aperture driving unit in FIG. 3) 305 controls the exposure state of the imaging element 306 by driving the mechanical shutter 303 and the aperture 304. As an unit configured to control the amount of exposure, an optical filter such as an ND filter may also be provided.

The imaging element 306 receives light from an object imaged through an imaging optical system, performs a photoelectric conversion, and outputs an electrical signal. In the case of a laminated type imaging element, an imaging layer and a circuit layer are provided therein. An imaging signal processing circuit 307 processes the output signals of the imaging element 306 and outputs the processed image signals. A first memory unit (denoted as a memory unit I in FIG. 3) 308 stores image signals processed by the imaging signal processing circuit 307 and the like.

An overall control calculation unit 309 is a central unit responsible for controlling the entire imaging system, and includes a central processing unit (CPU). The CPU executes a program read from the second memory unit (denoted as a memory unit II in FIG. 3) 314, thereby controlling the operation of each unit. The second memory unit 314 stores a calculation result of the CPU, camera information set in the imaging apparatus by the operation of a user, and the like. A storage medium control interface (I/F) unit 310 performs processing of recording image signals and the like in a storage medium 312 or of reading information from the storage medium 312 according to a control command of the overall control calculation unit 309. The storage medium 312 is detachable from the main body of an imaging apparatus. A display unit 311 includes a display device such as a liquid crystal display panel or the like, and displays image data and the like on a screen according to a control command of the overall control calculation unit 309. An external interface (I/F) unit 313 is a communication processing unit that transmits or receives information to or from an external device such as a computer. The imaging apparatus includes the display unit 311 in the present embodiment, but, in the case of an imaging apparatus having no display unit, image information and related information are output to an external display device via the external I/F unit 313. For example, processing of alternately outputting still images and live view images at the time of AF continuous shooting and processing of outputting only live view images are executed. An operation unit 315 includes an input device such as a switch or a touch panel, receives the operation instruction of a user, and outputs an operation instruction signal to the overall control calculation unit 309. The overall control calculation unit 309 controls the entire imaging system on the basis of information related to the imaging mode of an imaging system, exposure conditions, and the like set by a user using the operation unit 315.

Light from an object passing through the lens unit 301 is adjusted to an appropriate amount of light at the aperture 304, and is imaged on the imaging plane of the imaging element 306. A photoelectric conversion unit constituting the pixel portion 101 of the imaging element 306 performs photoelectric conversion on an optical image of the object and outputs electrical signals. The electrical signals are further objected to gain control, converted from analog signals to digital signals by A/D conversion, taken in as R, Gr, Gb, and B signals, and sent to the imaging signal processing circuit 307.

The imaging signal processing circuit 307 performs predetermined calculation processing using captured image data. The overall control calculation unit 309 performs exposure control and distance measurement control on the basis of an obtained result of the calculation. As a result, AE (automatic exposure) processing and EF (flash automatic dimming light emission) processing of the through the lens (TTL) method are performed. In addition, the imaging signal processing circuit 307 performs predetermined calculation processing using captured image data and performs auto white balance (AWB) processing of the TTL method on the basis of an obtained result of the calculation. In addition, the imaging signal processing circuit 307 performs various types of signal processing such as low pass filter processing for reducing noise, shading correction processing, and white balance processing, and further performs various types of correction, compression of image signals, and the like.

The lens unit 301 during photographing is objected to control such as zoom driving and focus driving by a lens driving unit 302. Each of the mechanical shutter 303 and the aperture 304 is driven by the mechanical shutter and aperture driving unit 305 according to a control command of the overall control calculation unit 309. The first memory unit 309 temporarily stores captured image signals. The storage medium control T/F unit 310 performs processing of recording image signals in the storage medium 312 and processing of reading signals from the storage medium 312. The display unit 311 displays the captured images on a screen.

Figures 4, 5:
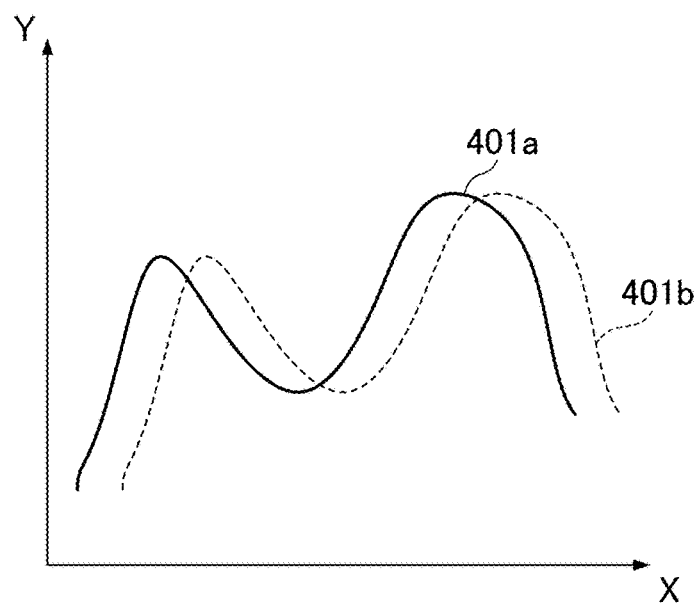
FIG. 4 is a diagram which shows a focus detection signal in the embodiment of the present invention.
FIG. 5 is a diagram which shows a focusing determination table in the first embodiment.

Next, focusing determination in the present embodiment will be described with reference to FIG. 4. FIG. 4 is a diagram which shows a focus detection signal when each output signal of the A pixel and the B pixel in the present embodiment is sent to the imaging signal processing circuit 307. In FIG. 4, a horizontal axis X indicates the position of a coupled signal in the pixel alignment direction and a vertical axis Y indicates the intensity of the signal. A focus detection signal 401a corresponds to a signal of the A image, and a focus detection signal 401b corresponds to a signal of the B image. These signals are signals each formed as an A image signal and a B image signal which are focus detection image signals. In the example shown in FIG. 4, since the lens unit 301 is in a defocus state with respect to the imaging element 306, the focus detection signal 401a shifts to the left side and the focus detection signal 401b shifts to the right side. The amount of shift of the signals of the A image and the B image is calculated by the imaging signal processing circuit 307, and thereby an amount of defocus is calculated based on the amount of image shifts. That is, it is possible to detect how much the lens unit 301 shifts from an in-focus state.

Specifically, the imaging signal processing circuit 307 performs correlation calculation for obtaining a phase difference between the A image signal and the B image signal, and performs distance measurement calculation for calculating an object distance based on the phase difference. The object distance is a distance from an imaging apparatus to an object, and is calculated as an amount corresponding to the amount of defocus. Equation (1) can be used for an amount U representing a degree of coincidence between the A image and the B image.

$$U = \sum_{j=0} \{(a_j - b_j)\} \qquad (1)$$

Here, $a_j$ is a signal of a $j^{th}$ A pixel, and $b_j$ is a signal of a B pixel. The amount U of the Equation (1) is the minimum value at the time of focusing.

Furthermore, processing of calculating a value of U is performed by relatively shifting the A image with respect to the B image by p pixels. The quantity calculated by Equation (2) is denoted as P.

$$P = \sum_{j=0} \{(a_{j+p} - b_j)\} \quad (2)$$

P is the minimum value in the amount of shift at the time of focusing. The amount of defocus indicating how much shifting there has been from an in-focus position is calculated on the basis of the amount of shift.

If the amount of defocus is zero, that is, in the case of focusing, the A image and the B image coincide with each other, but if there is a difference between the A image and the B image, the accuracy of the imaging plane phase difference AF decreases. Therefore, for example, processing of obtaining the area of a common region of two images and determining a reliability according to the obtained area is performed. It is determined that the reliability of focusing increases as the area becomes larger, and the reliability of focusing decreases as the area becomes smaller.

Next, the imaging signal processing circuit 307 calculates the steepness of edges of the focus detection signals 401a and 401b in FIG. 4. The steepness (referred to as E) of edges are calculated using Equation (3).

$$E = \sum_{j=0} \{(|a_j - a_{j+1}|) + (|b_j - b_{j+1}|)\} \quad (3)$$

In Equation (3), if the E value is a large value, it is determined that the reliability of focusing is high, and, if the E value is a small value, it is determined that the reliability of focusing is low.

FIG. 5 is a diagram which illustrates a focusing determination table of the present embodiment. The focusing determination table includes the following four stages of state values A to D in accordance with the reliability of correlated calculation results and the reliability based on the edge steepness E. The reliability of the correlation calculation results is set to three stages of "large", "medium", and "small", and the reliability is regarded to be higher as the correlation calculation result (U value) decreases. In addition, the reliability based on the edge steepness E is set to three stages of "high", "medium", and "low", and the reliability is regarded to be higher as the F value increases.

A: An in-focus state.
B: An out-of-focus state. If photographing conditions are changed a little, bringing into focus will be possible.
C: An out-of-focus state. If photographing conditions are changed more than in B, bringing into focus will be possible.
D: An out-of-focus state. If the photographing conditions are not greatly changed, bringing into focus will not be possible.

For example, if the correlation calculation result is "small" and the edge steepness E is "high", a state value is A, which is a state value at the time of focusing. For convenience of description in the present embodiment, focusing determination in four stages is described, but, of course, focusing determination with less than four levels or more than five levels is also possible.

Figure 6:
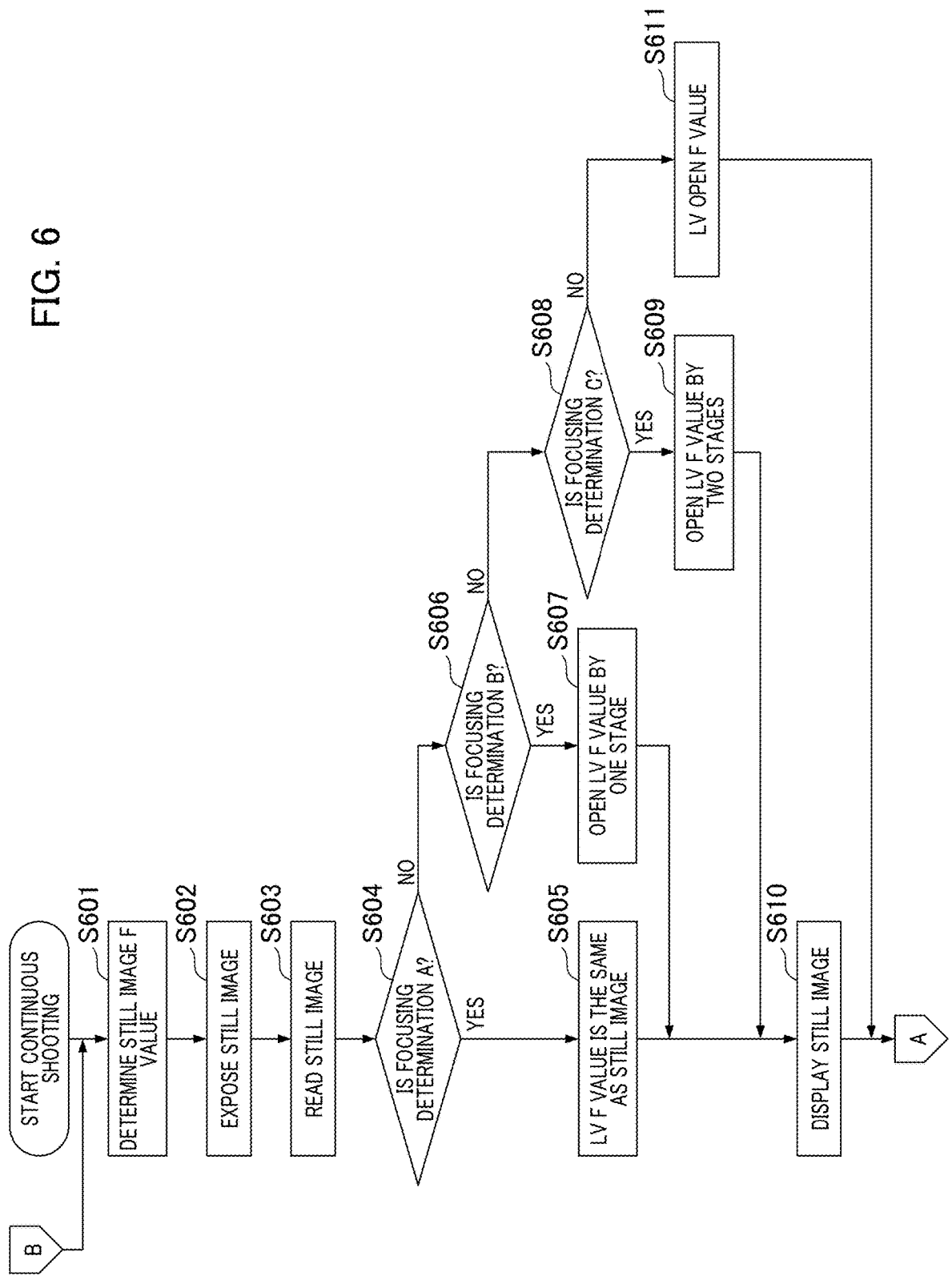
FIG. 6 is a flowchart which describes processing of the embodiment of the present invention.
Figure 7:
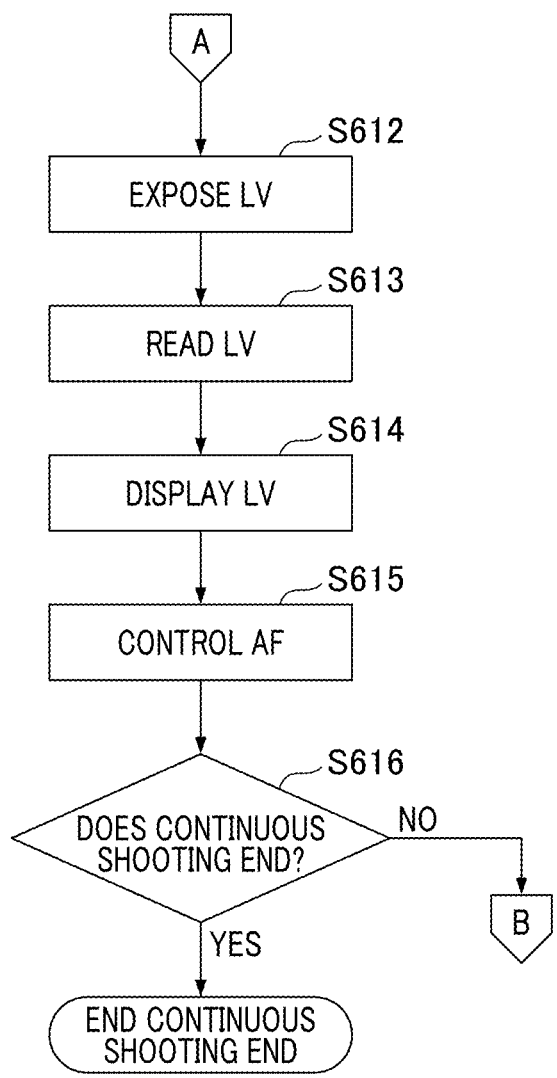
FIG. 7 is a flowchart which describes processing following FIG. 6.

A processing example at the time of AF continuous shooting in the present embodiment will be described with reference to FIGS. 6 and 7. FIGS. 6 and 7 are flowcharts which describe the AF continuous shooting using the focusing determination table.

The overall control calculation unit 309 at the start of continuous shooting determines the aperture F value of still image photographing (S601). Next, the exposure of the imaging element 306 for still image photographing starts (S602). After the exposure ends, the image signal of a still image is read from the imaging element 306 (S603). Next, the overall control calculation unit 309 determines a result of the focusing determination according to the focusing determination table of FIG. 5. It is determined whether the result of the focusing determination corresponds to the state value A (S604). If the result corresponds to A (in the case of in focus), the procedure proceeds to S605, and otherwise, the procedure proceeds to S606.

The overall control calculation unit 309 sets the aperture F value of the live view (LV) photographing to an F value which is the same as in the still image photographing in S605, and the procedure proceeds to S610. The overall control calculation unit 309 determines whether a result of the focusing determination corresponds to a state value B in S606. If the result corresponds to B, the procedure proceeds to S607, and otherwise, the procedure proceeds to S608. The overall control calculation unit 309 changes the aperture F value of the live view photographing to an open side by one stage as compared to the time of still image photographing in S607, and the procedure proceeds to S610.

The overall control calculation unit 309 determines whether a result of the focusing determination corresponds to a state value C in S608. If the result corresponds to C, the procedure proceeds to S609, and otherwise, that is, in the case of D, the procedure proceeds to S611. The overall control calculation unit 309 changes the aperture F value of the live view photographing to the open side by two stages as compared to the time of still image photographing in S609 and the procedure proceeds to S610.

If a result of the focusing determination corresponds to any one of state values A, B, and C, processing of displaying captured still images on the screen of the display unit 311 is executed in S610, and the procedure proceeds to S612 of FIG. 7. On the other hand, when the result of focusing determination corresponds to the state value D, the overall control calculation unit 309 sets the aperture F value of live view photographing to an open state in S611. Then, the procedure proceeds to S612 of FIG. 7.

The overall control calculation unit 309 starts an exposure of the imaging element 306 for live view photographing in S612. Then, the signal of a live view image is read from the imaging element 306 (S613), and the live view image is displayed on the screen of the display unit 311 (S614). The overall control calculation unit 309 performs AF control (S615). Thereafter, the overall control calculation unit 309 determines whether to end continuous shooting on the basis of an operation instruction performed using the operation unit 315 by a user (S616). If it is determined to continue to perform the continuous shooting, the procedure returns to S601. If it is determined to end the continuous shooting in S616, a series of processing ends.

In the present embodiment, if a result of the focusing determination corresponds to the state value B or C, the aperture value at the time of live view photographing changes. To that extent, it is necessary to control the exposure time and ISO sensitivity to match the brightness of images with that of still images. At this time, the overall control calculation unit 309 determines which of the exposure time and the ISO sensitivity to change preferentially in accordance with a result of the determination on the edge steepness. For example, if a value of the edge steepness is low, there is a possibility that object shaking may occur. In this case, the overall control calculation unit 309 sets the exposure time to be short and sets the ISO sensitivity to the same value as in the case of still images. Conversely, if the value of the edge steepness is high, the overall control calculation unit 309 set the exposure time to be the same as in the case of still images, and sets the ISO sensitivity to be lower. As a result, it is possible to increase the focusing determination accuracy of the phase difference AF at the time of live view photographing.

Figure 8:
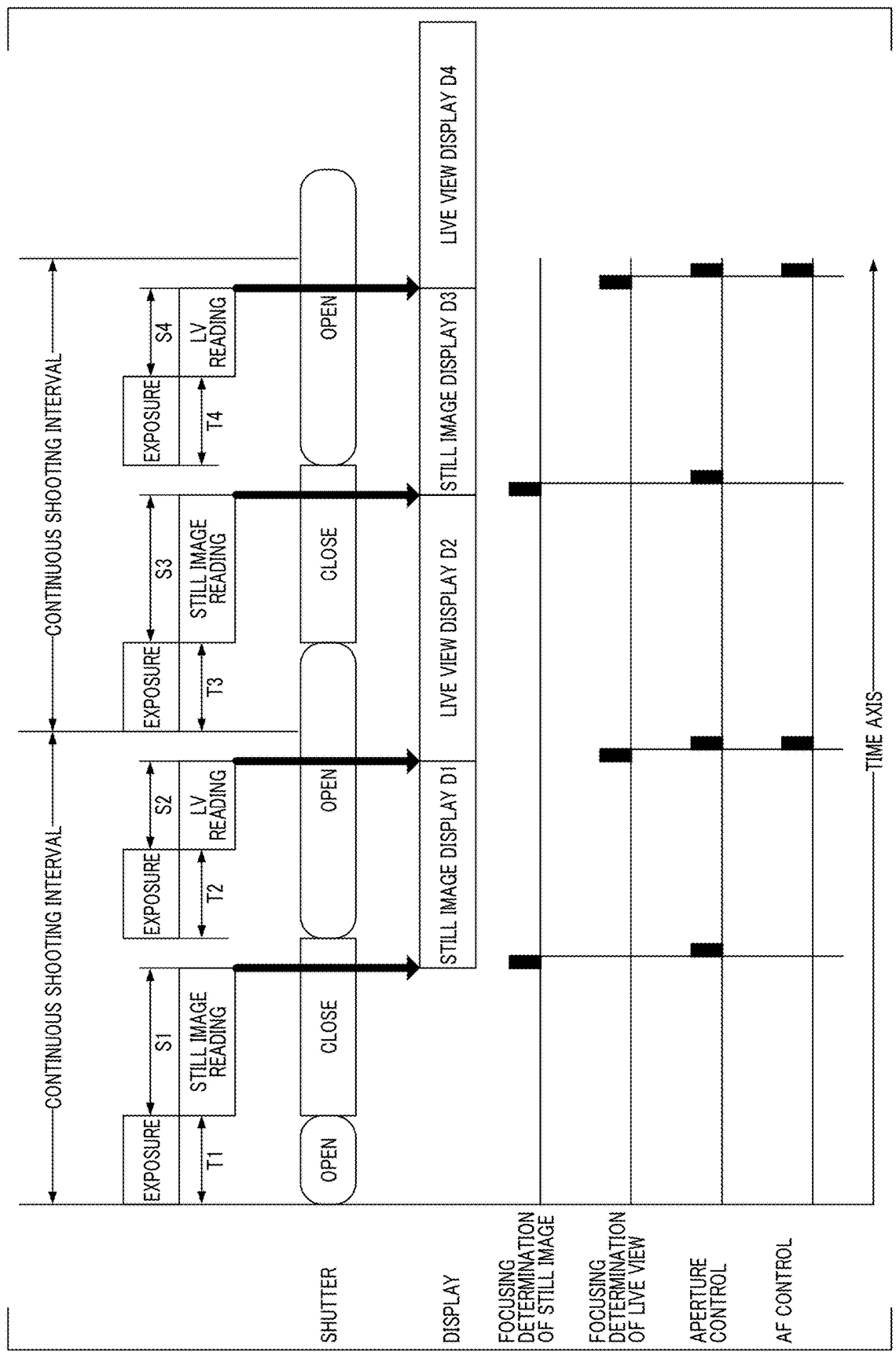
FIG. 8 is a timing diagram of alternate display in the embodiments of the present invention.

FIG. 8 shows a timing chart when a still image display and a live view display are alternately performed. Each of periods T1 to T4 respectively indicate an exposure time. Each of periods S1 and S3 indicates a still image reading period in S603 of FIG. 6, and each of periods S2 and S4 indicates a live view (LV) reading period in S613 of FIG. 7. In the timing chart, the open or closed state of a shutter is shown. It is shown that the still image display in S610 of FIG. 6 and the live view display in S614 of FIG. 7 are alternately performed in a display period. Periods D1 and D3 are periods for the still image display in S610 of FIG. 6, and periods D2 and D4 are periods for the live view display in S614 of FIG. 7. The timings of the focusing determination, the aperture control, and the AF control are indicated by black rectangle symbols, respectively. The timings of the focusing determination of still images and the focusing determination of live view images are after the end of the reading periods S1 to 34, respectively. The aperture control is performed after the focusing determination of still images, and the aperture control and the AF control are performed after the focusing determination of live view images.

After the end of an exposure period T1, the signals of still images are acquired in a still image reading period S1. Then, the focusing determination processing is performed on the still images, and, if a result of the focusing determination corresponds to one of the state values A, B, and C of FIG. 5, a still image display is performed in a period D1. Then, the aperture control is performed. After the end of an exposure period T2, the signals of live view images are read in a live view reading period S2. The live view display is performed in a period D2. The aperture control and the AF control are performed after the focusing determination of live view images.

Figure 9:
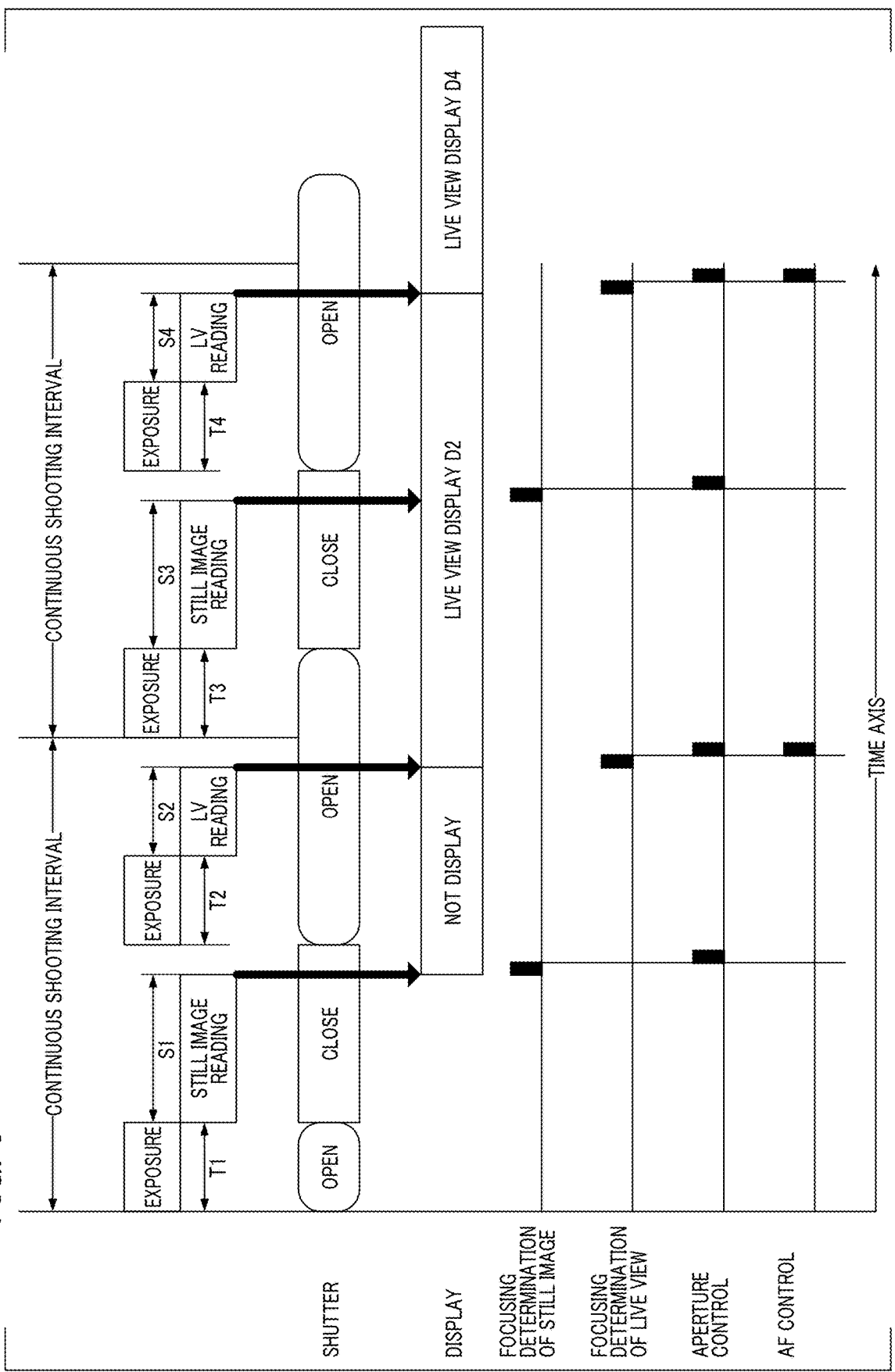
FIG. 9 is a timing diagram when alternate display is not performed in the embodiments of the present invention.

FIG. 9 shows a timing chart when the still image display and the live view display are not alternately performed. Each item is the same as in FIG. 8, but the still image display is not performed. After the end of the exposure period T1, signals are read in the still image reading period S1. Then, the focusing determination of still images is performed. If a result of the focusing determination corresponds to the state value D of FIG. 5, the still image display is not performed. Then, the aperture is set to be open, and the signals of live view images are read in the live view reading period S2 after the end of the exposure period T2. The live view display is performed in the period D2. The aperture control and the AF control are performed after the focusing determination of live view images.

In the present embodiment, the aperture control at the time of live view photographing is determined according to the focusing determination table of FIG. 5 and an aperture state at the time of still image photographing. If images at the time of still image photographing and images at the time of live view photographing are alternately displayed, control to decrease a difference in exposure conditions (aperture values) is performed. As a result, even if the aperture is narrowed at the time of still image photographing during AF continuous shooting, both the maintenance of a display quality and followability during framing can be achieved.

In the first embodiment, the control to decrease a difference in aperture value as exposure conditions is shown, but control to decrease a difference in exposure time, sensitivity (ISO sensitivity), and the like in addition to the aperture value as the exposure conditions may also be performed. That is, a program diagram at the time of still image photographing and a program diagram at the time of live view photographing may have the same configuration.

In addition, if the focusing determination is performed both at the time of still image photographing and at the time of live view photographing, weighting may be performed on each determination. This is because focusing determination accuracy may be low due to a lower resolution at the time of live view photographing than the resolution of still images, and it is preferable to set the weight of a result of the focusing determination at the time of live view photographing to be low.

Second Embodiment

Next, a second embodiment of the present invention will be described. In the present embodiment, a configuration in which the aperture at the time of live view photographing is controlled in accordance with a difference in focal distance of the lens unit 301 or object distance, in addition to the aperture state at the time of still image photographing, will be described. In the present embodiment, the same reference numerals which have been already used will be used for the same constituents as in the first embodiment, so that the descriptions thereof will be omitted and differences will be mainly described.

The appearance of an image varies greatly if the aperture value changes according to a difference in focal distance of the lens unit 301. For example, if the aperture value is changed by two stages with a short focal distance at a wide angle, a change in appearance of an image is small, but if the aperture value is changed by two stages at the time of telephoto with a long focal distance, the change in appearance of an image increases. Therefore, in the present embodiment, the following control is performed in accordance with the focal distance of the lens unit 301.

In the Case of a Wide Angle Side in which a Focal Distance is Short (for Example, 50 mm or Less)

The overall control calculation unit 309 changes the aperture value in the live view aperture control in S607 of FIG. 6 to the open side by two stages as compared to the case of still images when it is determined that a result of the focusing determination of FIG. 5 is the state value B. In addition, the overall control calculation unit 309 changes the aperture value in the live view aperture control in S609 of FIG. 6 to the open side by four stages as compared to the case of still images when it is determined that a result, of the focusing determination of FIG. 5 is the state value C.

In the Case of Telephoto Side with a Long Focal Distance

The overall control calculation unit 309 performs the same processing as in the first embodiment using the live view aperture control.

Next, a difference in object distance will be described. Depending on a distance from the imaging apparatus to an object, the appearance of an image greatly varies if the aperture value changes. For example, when the object distance is large and the aperture value is changed by two stages, a change in appearance of an image is small, but when the object distance is small and the aperture distance is changed by two stages, the change in appearance of an image increases. Therefore, in the present embodiment, the following control is performed in accordance with an object distance.

In the Case of a Large Object Distance (for Example, 3 m or More)

The overall control calculation unit 309 changes the aperture value in the live view aperture control in S607 of FIG. 6 to the open side by two stages as compared to the case of still images when it is determined that a result of the focusing determination of FIG. 5 is the state value B. In addition, the overall control calculation unit 309 changes the aperture value in the live view aperture control in S609 of FIG. 6 to the open side by four stages as compared to the case of still images when it is determined that a result of the focusing determination of FIG. 5 is the state value C.

In the case of an object distance is small.

The overall control calculation unit 309 performs the same processing as in the first embodiment using the live view aperture control.

In addition, the following control is performed in accordance with the focal distance of the lens unit 301 and the object distance in the present embodiment.

In the case in which the focal distance is longer than a threshold value, and the object distance is greater than a threshold value.

The overall control calculation unit 309 changes the aperture value in the live view aperture control of S607 of FIG. 6 to the open side by two stages as compared to the case of still images when it is determined that a result of the focusing determination of FIG. 5 is the state value B. In addition, the overall control calculation unit 309 changes the aperture value in the live view aperture control in S609 of FIG. 6 to the open side by four stages as compared to the case of still images when it is determined that a result of the focusing determination of FIG. 5 is the state value C.

In the Case in which the Focal Distance is Longer than a Threshold Value and the Object Distance is Equal to or Less than a Threshold Value The overall control calculation unit 309 performs the same processing as in the first embodiment using the live view aperture control.

Next, the focusing determination in accordance with a mode will be described with reference to FIG. 10. FIG. 10A illustrates a focusing determination table in a first focusing determination mode that gives priority to followability in framing. The first focusing determination mode is a mode that gives priority to display update over focusing accuracy of AF. FIG. 10B illustrates a focusing determination table in the second focusing determination mode that gives priority to AF accuracy in framing. The second focusing determination mode is a mode that gives priority to the focusing accuracy of AF over a display update. The overall control calculation unit 309 switches the focusing determination table for each mode. Each stage of reliability and the state values A to D are as described in FIG. 5.

In the case of the first focusing determination mode shown in FIG. 10A, in order to perform alternate display of still images and live view images as much as possible, the number of state values D decreases in the focusing determination table as compared with FIG. 5. That is, a case in which a result of correlation calculation is "large" and a steepness of the edge is "medium", and a case in which a result of the correlation calculation is "medium" and a steepness of the edge is "low" are determined to be the state value C. Therefore, the frequency with which still images and live view images are alternately displayed is relatively high.

In the case of the second focusing determination mode shown in FIG. 10B, to give priority to an AF accuracy, the number of state values D is increased in the focusing determination table as compared with FIG. 5. That is, a case in which a result of the correlation calculation is "large" and a steepness of the edge is "high", and a case in which a result of the correlation calculation and a steepness of the edge are "medium", and a case in which a result of the correlation calculation is "small" and a steepness of the edge is "low" are determined to be the state value D. Therefore, the frequency at which live view images are displayed is relatively high.

In the present embodiment, the exposure state of the imaging element 306 is changed by the aperture control in accordance with the focal distance of the lens unit 301 and the object distance. As a result, even if the aperture is narrowed at the time of still image photographing during the AF continuous shooting, both the maintenance of a display quality and followability during framing can be achieved in accordance with a photographing condition and a photographing mode.

Third Embodiment

Figure 11:
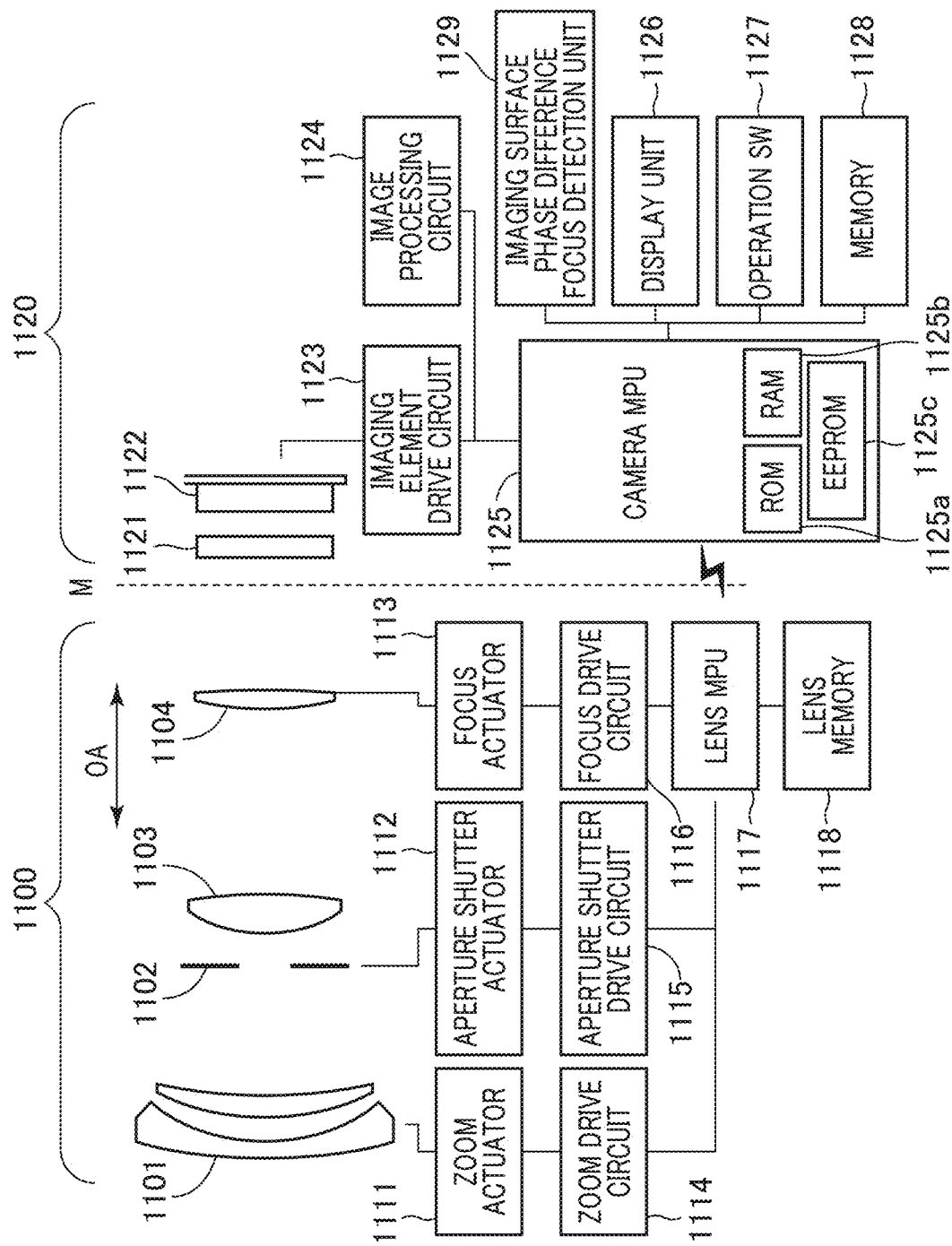
FIG. 11 is a schematic diagram of an imaging system in a third embodiment.

FIG. 11 is a block diagram which shows a configuration of an imaging apparatus having the form of a camera system made of a camera main body capable of interchanging a plurality of photographing lens and a photographing lens according to a third embodiment of the present invention. The camera system (the imaging apparatus) of the present embodiment as a lens interchangeable single lens reflex camera, and includes a lens unit 1100 made of a photographing lens and the camera main body 1120. The lens unit 1100 is attached to the camera main body 1120 via the mount M indicated by a dotted line in the center of FIG. 11.

The lens unit 1100 includes an imaging optical system (a first lens group 1101, an aperture 1102, a second lens group 1103, and a third lens group (a focus lens 1104)), a drive and control system. The first lens group 1101 is disposed at the tip of the lens unit 1100 and is movably held in an optical axis direction OA. The aperture 1102 has a function as a mechanical shutter that controls the exposure time when still images are photographed in addition to the function of adjusting the amount of light at the time of photographing. The aperture 1102 and the second lens group 1103 are integrally movable in the optical axis direction OA and realize a zoom function by moving in conjunction with the first lens group 1101. The focus lens 1104 is also movable in the optical axis direction OA, and the object distance (focusing distance) at which the lens unit 1100 is focused changes according to a position. By controlling the position of the focus lens 1104 in the optical axis direction OA, at is possible to perform focus adjustment for adjusting the focal distance of the lens unit 1100.

The drive and control system includes a zoom actuator 1111, an aperture actuator 1112, a focus actuator 1113, a zoom drive circuit 1114, an aperture drive circuit 1115, a focus drive circuit 1116, a lens MPU 1117 (processor), and a lens memory 1118.

The zoom drive circuit 1114 drives the first lens group 1101 and the second lens group 1103 in the optical axis direction OA using the zoom actuator 1111, and control the angle of view of the optical system of the lens unit 1100. The aperture drive circuit 1115 drives the aperture 1102 using the aperture actuator 1112, and control the aperture diameter and opening and closing operations of the aperture 1102. The focus drive circuit 1116 drives the focus lens 1104 in the optical axis direction OA using the focus actuator 1113, and controls a focusing distance of the optical system of the lens unit 1100. In addition, the focus drive circuit 1116 detects a current position of the focus lens 1104 using the focus actuator 1113.

The lens MPU 1117 performs entire calculation and control related to the lens unit 1100, and controls the zoom drive circuit 1114, the aperture drive circuit 1115, and the focus drive circuit 1116. Moreover, the lens MPU 1117 is connected to the camera MPU 1125 through the mount M, and communicates commands or data therewith. For example, the lens MPU 1117 detects the position of the focus lens 1104, and notifies lens positional information for a request from the camera MPU 1125. The lens positional information includes information on the position of the focus lens 1104 in the optical axis direction OA, the position and the diameter of an exit pupil in the optical axis direction OA in a state in which the optical system is not moved, the position and the diameter of a lens frame controlling the light flux of the exit pupil in the optical axis direction OA, and the like. In addition, the lens MPU 1117 controls the zoom drive circuit 1114, the aperture drive circuit 1115, and the focus drive circuit 1116 in accordance with a request from the camera MPU 1125. Optical information necessary for the imaging plane phase difference AF is stored in advance in the lens memory 1118. The lens MPU 1117 executes, for example, a program stored in a built-in non-volatile memory or the lens memory 1118, thereby controlling the operation of the lens unit 1100.

The camera main body 1120 includes an optical system (an optical low pas filter 1121 and an imaging element 1122) and a drive and control system. The optical low pass filter 1121 reduces false color and moiré of a captured image. The imaging element 1122 is constituted by an CMOS image sensor and a peripheral circuit, and horizontal m pixels and vertical n peels (n and m are integers of two or greater) are disposed. The imaging element 1122 of the present embodiment has a pupil division function and the imaging plane phase difference AF using image data having parallax is possible.

The drive and control system includes an imaging element drive circuit 1123, an image processing circuit 1124, a camera MPU 1125 (processor), a display unit 1126, an operation switch group 1127, a memory 1128, and an imaging surface phase difference focus detection unit 1129. The image processing circuit 1124 displays a focus detection signal from image data output by the imaging element 1122 and generates image data for display and recording.

The imaging element drive circuit. 1123 controls the operation of the imaging element 1122, performs an A/D conversion on acquired image data, and transmits the image data to the camera MPU 1125. The image processing circuit 1124 performs general image processing performed by digital cameras, such as a γ conversion, white balance adjustment processing, color interpolation processing, or compression coding processing, on the image data acquired by the imaging element 1122.

The camera MPU 1125 performs overall calculation and control for the camera main body 1120, and controls the imaging element drive circuit 1123, the image processing circuit 1124, the display unit 1126, the operation switch group 1127, the memory 1128, and the imaging surface phase difference focus detection unit 1129. The camera MPU 1125 is connected to the lens MPU 1117 via a mount M, and communicates commands or data with the lens MPU 1117. The camera MPU 1125 issues a lens position acquisition request, aperture with a predetermined driving amount, focus lens, and zoom driving requests, an acquisition request of optical information peculiar to the lens unit 1100, and the like to the lens MPU 1117. A ROM 1125a storing a program for controlling the operation of the camera main body 1120, a RAM 1125b storing variables, and an EEPROM 1125c storing various parameters are built in the camera MPU 1125.

The display unit 1126 is constituted by an LCD and the like, and displays information on the photographing mode of the camera main body 1120, a preview image before photographing, a confirmation image after photographing, an image in an in-focus state at the time of focus detection, and the like. The operation switch group 1127 is constituted by a power switch, a release (imaging trigger) switch, a zoom operation switch, a photographing mode selection switch, and the like. The memory 1128 records a photographed image using a removable flash memory.

The imaging surface phase difference focus detection unit 1129 performs focus detection processing by the imaging plane phase difference A based on an imaging plane phase difference AF signal obtained by the image processing circuit 1124. Specifically, the image processing circuit 1124 generates a pair of image data formed by light flux passing through a pair of pupil regions of the photographing optical system as imaging plane phase difference AF signals, and the imaging surface phase difference focus detection unit 1129 detects an amount of focus shift (an amount of defocus) on the basis of an amount of shift of the pair of image data. In this manner, the imaging surface phase difference focus detection unit 1129 of the present embodiment performs imaging plane phase difference AF on the basis of the output of the imaging element 1122 without using a dedicated AF sensor.

Figure 12:
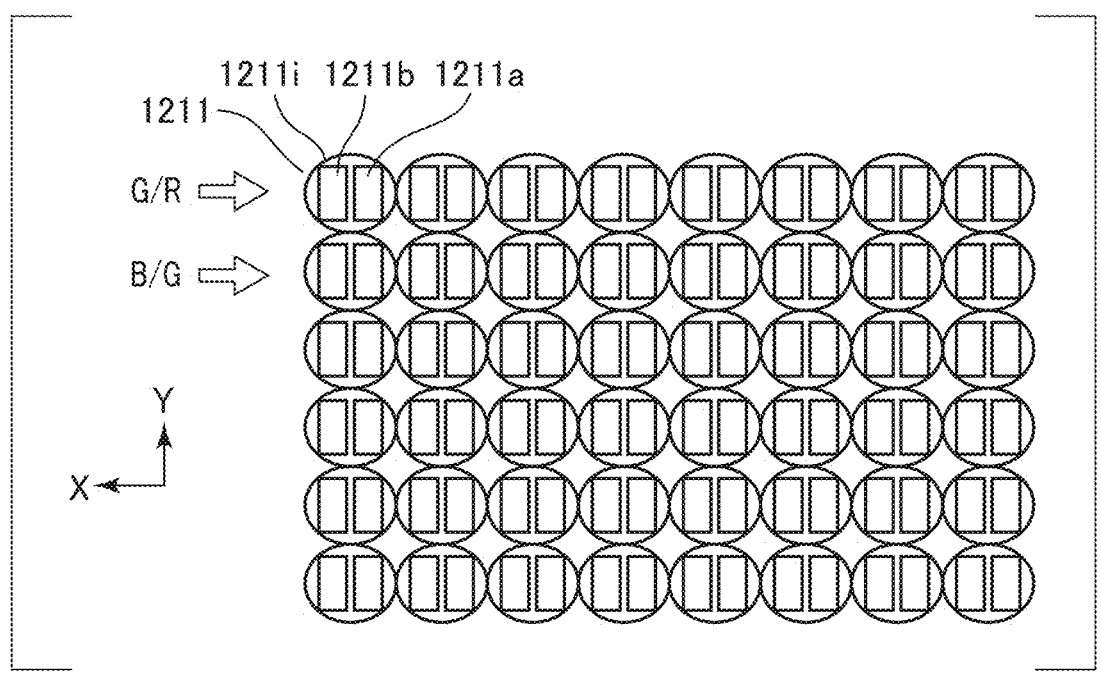
FIG. 12 is a pixel arrangement diagram of an imaging element in the third embodiment.

The operation of the imaging surface phase difference focus detection unit 1129 will be described in details with reference to FIG. 12. FIG. 12 is a diagram which shows the pixel arrangement of the imaging element 1122 according to the present embodiment, and shows a state in which a range of six vertical (Y direction) rows and eight horizontal (X direction) columns of a two dimensional C-MOS area sensor is observed from the lens unit 1100 side. Color filters of Bayer array are provided in the imaging element 1122. In the Bayer array of the present embodiment, green (G) and red (R) color filters are alternately arranged in an X direction from the left in order in pixels of odd numbered rows, and blue (B) and green (G) color filters are alternately arranged in the X direction from the left in order in pixels of even numbered rows, for example. In a pixel 211, a circle indicated by a reference numeral 1211i represents an on-chip microlens, and each of a plurality of rectangles (reference numerals 1211a and 1211b) arranged inside the on-chip microlens 1211i represents a photoelectric conversion unit.

The imaging element 1122 of the present embodiment includes first focus detection pixels and second focus detection pixels which receive light flux passing through each of different pupil portion regions of the photographing optical system. In the present embodiment, the photoelectric conversion units of all pixels in the imaging element 1122 are divided into two regions in the X direction, and the photoelectric conversion signal of one divided region and the sum of two photoelectric conversion signals can be independently read. However, a plurality of divisions in the X direction and the Y direction may also be performed. Then, regarding the signals independently read, it is possible to obtain a signal corresponding to a signal to be obtained in the other photoelectric conversion region by taking a difference between the sum of two photoelectric conversion signals and the photoelectric conversion signal in one divided region. The photoelectric conversion signals in these divided regions can be used for phase difference type focus detection in a method to be described below, and can also generate a 3-Dimensional (3D) image constituted from a plurality of images having parallax information. On the other hand, the sum of two photoelectric conversion signals is used as a normal photographing image.

Here, the imaging plane phase difference AF signal will be described. In the present embodiment, the exit light flux of the photographing optical system is pupil-divided into the on-chip microlens 1211*i* of FIG. 12 and the divided photoelectric conversion units 1211*a* and 1211*b*. Then, for a plurality of pixels 1211 within a predetermined range, which are arranged in the same pixel row, a combined and organized output of the photoelectric conversion unit 1211*a* is set as an A image for imaging plane phase difference AF (A image for AF). In addition, a combined and organized output of the photoelectric conversion unit 1211*b* as set as a B image for the imaging plane phase difference AF (B image for AF). The outputs of the photoelectric conversion units 1211*a* and 1211*b* use a pseudo luminance (Y) signal calculated by adding the outputs of green, red, blue, and green color filters included in the unit array of color filters. However, the A image for AF and the B image for AF may also be organized for each of red, blue, and green colors. It is possible to detect an amount of focus shift (an amount of defocus) in a predetermined region by detecting an amount of relative image shift of the A image for AF and the B image for AF generated in this manner using correlation calculation. In the present embodiment, the output of one photoelectric conversion unit and the sum of the outputs of all photoelectric conversion units are read from the imaging element 1122. For example, if the output of the photoelectric conversion unit 1211*a* and the sum of the outputs of the photoelectric conversion units 1211*a* and 1211*b* read, the output of the photoelectric conversion unit 1211*b* is acquired by subtracting the output of the photoelectric conversion unit 1211*a* from the sum. As a result, both the A image for AF and the B image for AF can be obtained, and the imaging plane phase difference AF can be realized. Such an imaging element is known as disclosed in, for example, Japanese Patent Laid-Open No. 2004-134867, and thus further detailed description will be omitted.

Here, a configuration in which an exit pupil is divided into two in the horizontal direction as an example has been described, but, the exit pupil for some pixels in the imaging element 1122 may also be divided into two in the vertical direction. In addition, the exit pupil may also be divided in both the horizontal and vertical directions. By providing pixels in which the exit pupil is divided in the vertical direction, the imaging plane phase difference AF corresponding to the contrast of an object in the vertical direction as well as the horizontal direction can be performed.

As described above, the imaging element 1122 has not only an imaging function but also a function as a focus detection device. Since the imaging element includes focus detection pixels which receive a light flux having divided an exit pupil, the imaging plane phase difference AF can be performed as a focus detection method.

Figure 13:
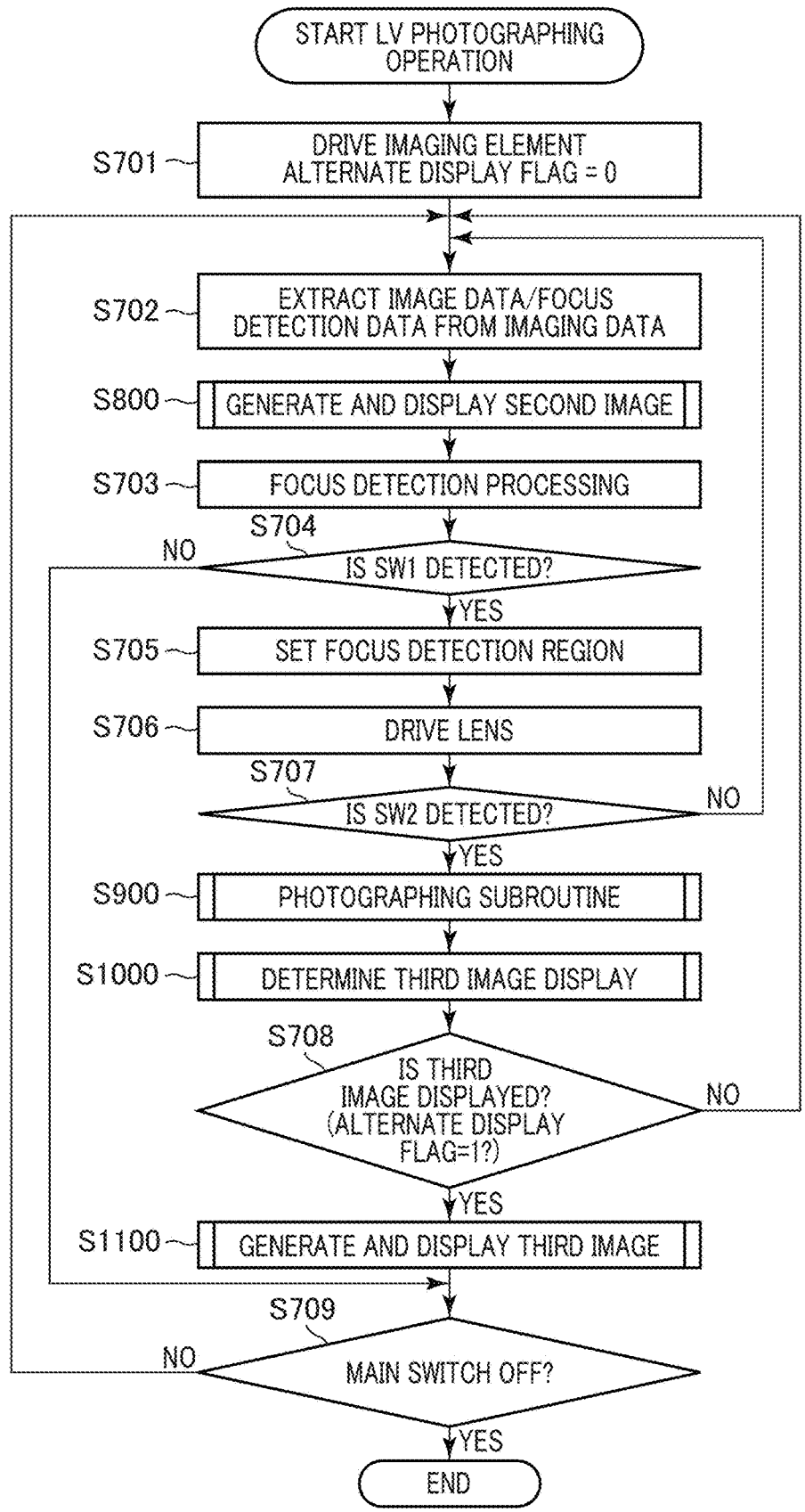
FIG. 13 is a flowchart of display processing in the third embodiment.

FIG. 13 is a flowchart which describes focus detection processing, imaging processing, and display processing executed by the camera main body 1120 according to the third embodiment of the present invention. In the present flowchart, the processing of each step, unless otherwise noted, is realized by the camera MPU 1125 controlling each unit of the camera main body 1120 or communicating with the lens MPU 1117 according to a program stored in the ROM 1125*a*. Operations at the time of the imaging apparatus performing LV photographing for performing imaging in a live view (LV) state in which image data for a display are sequentially displayed on the display unit 1126 will be described in the following description.

The camera MPU 1125 controls the driving of the imaging element drive circuit 1123 and the imaging element 1122, an acquires imaging data by imaging an object in S701. Here, since there is a driving operation for photographing moving images for LV display, charge accumulation and reading in time in accordance with a frame rate for LV display are performed, and photographing using a so-called electronic shutter is performed. The LV display has a main purpose for a photographer (user) to confirm an imaging range and imaging conditions, and the frame rates may be, for example, 30 frames/second (imaging interval 33.3 ms) or 60 frames/second (imaging interval 16.6 ms). In the processing of S701, an alternate display flag to be described below is initialized to zero as an initial value setting operation.

Next, the camera MPU 1125 acquires focus detection data obtained from a first focus detection pixel and a second focus detection pixel included in the focus detection region of an imaging element among the imaging data obtained in S701 in S702. In addition, the camera MPU 1125 generates an imaging signal and acquires image data obtained by applying color interpolation processing or the like to the generated imaging signal using the image processing circuit 1124. As described above, it is possible to acquire image data (image signal) and focus detection data (focus detection signal) with one imaging. If an imaging pixel, a first focus detection pixel, and a second focus detection pixel are individually constituted, image data is acquired by performing supplementary processing and the like of focus detection pixels. The camera MPU 1125 executes flicker detection for detecting the occurrence of flicker under set photographing conditions using an image signal (second image signal) obtained in the processing of S702. In the present embodiment, a result of the flicker detection executed at the time of power on of the camera main body 1120 or in accordance with a manual operation by a user is recorded in the memory 1128, and whether to execute an alternate display to be described below is determined in accordance with a result of the flicker detection. Any flicker detection method may be adopted if it is a known method. For example, in the present embodiment, flicker detection is executed by detecting a flicker light intensity change period and a feature point position (for example, refer to Japanese Unexamined Patent Application Publication No. 2015-220673), but the present invention is not limited thereto. For example, flicker detection may be executed by extracting a contrast difference occurring in an entire screen corresponding to an image signal and by comparing information on the extracted contrast difference with the flicker information stored inside the camera main body 1120 in advance.

Next, in S800, the camera MPU 1125 controls the image processing circuit 1124 to generate an image (an LV image) for LV display on the basis of the image signal (the second image signal) obtained in the process of S702, and to display the image on the display unit 1126. The image for LV display is, for example, a reduced image conforming to the resolution of the display unit 1126, and the image processing circuit 1124 performs reduction processing when image data is generated in the processing of S702. Then, the camera MPU 1125 causes the display unit 1126 to display the LV image (a second image) after the reduction processing. As described above, object imaging and a sequential display are performed at a predetermined frame rate during the LV display, so that a user can adjust the composition at the time of photographing and adjust the exposure conditions through the display unit 1126.

In S800, the camera MPU 1125 executes different processing depending on whether to perform an alternate display with the still images (a third image) for alternate display to be described below when the LV image (the second image) is generated based on the image signal (the second image signal) acquired in S702. In the case of performing an alternate display, processing for reducing a difference between the second image and the third image is performed, and a second image signal is generated. As a result, it is possible to display with less sense of discomfort when a display using the third image and the second image acquired under different exposure conditions or signal reading conditions is performed. Details of the processing of S800 will be described below. In the following description, a still image for recording (a first image) and a still image for alternate display (a third image) are generated on the basis of a first image signal to be described below, and an LV image (a second image) is generated on the basis of a second image signal.

Next, the camera MPU 1125 obtains an amount and a direction of defocus for each focus detection region in S703 by using focus detection data corresponding to the focus detection region acquired in S702. In the present embodiment, the camera MPU 1125 generates a focus detection image signal, calculates an amount of shift (phase difference) of a focus detection signal, and executes processing for obtaining the amount and the direction of defocus based on the calculated amount of shift. When a focus detection image signal is generated, the camera MPU 1125 performs processing (for example, gain adjustment, low-pass processing, and the like) that is different from signal processing performed when the second image signal is generated.

Since the second image signal which is the original data of the second image used for display is required to be able to confirm the composition, color, brightness, blurring condition, and the like of the imaging range on the display unit 1126, some signals may be saturated by gain processing. On the other hand, a focus detection image signal not including a saturation signal can perform focus detection with high accuracy. Also, since the second image is objected to image processing which corresponds the second image to still images used for an alternate display to be described below, sufficient contrast cannot be secured for performing focus detection, or a high frequency component signal cannot be obtained by low pass processing or the like in some cases. Therefore, the camera MPU 1125 performs processing different from the processing at the time of generating the second image on the second image signal, thereby making it possible to obtain contrast and a high frequency component signal, and generating a focus detection image signal which is suitable for focus detection in the processing of S703.

Next, the camera MPU 1125 detects ON or OFF of SW1 which is a switch indicating the start of photographing preparation in S704. A release (imaging trigger) switch which is one of the operation switch group 1127 can detect ON or OFF in two stages in accordance with the pushing amount of the release switch. The ON or OFF of SW1 described above corresponds to ON or OFF of the first stage of the release (imaging trigger) switch, and represents the start of photographing preparation.

Next, if ON of SW1 is not detected (or OFF is detected) in S704, the camera MPU 1125 advances the processing to S709 and determines whether a main switch included in the operation switch group 1127 is turned off. On the other hand, when ON of SW 1 is detected in S704, the camera MPU 1125 advances the processing to S705 and sets (selects) a focus detection region to be focused. In this case, a focus detection region instructed by a user may be set, or the camera MPU 1125 may automatically set, a focus detection region on the basis of information on the amount of defocus of a plurality of focus detection regions obtained by the processing of S704 and information such as a distance from the center of an imaging range of the focus detection region. In general, there is a high probability that an object that a user intends to photograph is present at a position with a short photographing distance, and a high probability that the object is present near the center of the imaging range. For example, when there are a plurality of objects, the camera MPU 1125 automatically sets a focus detection region which is considered to be appropriate in consideration of these conditions. Moreover, for example, when an object in which a main object can be determined and a background can be distinguished, the camera MPU 1125 sets a region in which the main object is present as a focal region.

Next, the camera MPU 1125 performs lens driving on the basis of an amount of defocus detected in a selected focus detection region in S706. In the case in which the amount of detected defocus is smaller than a predetermined threshold value, if lens driving is not necessarily configured, it is possible to suppress performance of the lens driving which is not frequently required.

Next, the camera MPU 1125 detects ON or OFF of SW2 which is a switch indicating an imaging start instruction in S707. As described above, the release (imaging trigger) switch can detect ON or OFF in two stages according to the pushing amount. The SW 2 described above corresponds to ON or OFF of the release (imaging trigger) switch in second stages and indicates the start of imaging. If ON of SW 2 is not detected in S707, the camera MPU 1125 returns to the processing in S702 and repeats the above-described LV display and focus detection.

If ON of SW2 is detected in S707, the procedure proceeds to S900, and the camera MPU 1125 executes photographing subroutine. Details of the photographing subroutine will be described below. If the photographing subroutine is executed in S900, the procedure proceeds to S1000.

Next, the display determination of the third image (the still image for alternate display) is performed in S1000, and then it is determined whether to display the third image on the display unit 1126 in S708. The third image is the still image for alternate display corresponding to the still image (the first image) for recording obtained in S900.

Next, if it is determined that the third image is to be displayed on the display unit 1126 in the processing of S708, the procedure proceeds to S1100, and the camera MPU 1125 generates the third image and displays the third image on the display unit 1126. On the other hand, if it is determined in S708 that the third image is not displayed, the third image is not generated and the procedure returns to S702. The details of the third image display determination performed in the processing of S1000 will be described below.

In S1100, the camera MPU 1125 generates the still image for alternate display (the third image) based on the still image for recording (the first image) and the LV image (the second image) obtained in the processing of S900. As described above, since the LV image is generated such that a difference from the still image for alternate display decreases beforehand, when the still image for alternate display (the third image) is generated, minimum necessary processing is performed. Facilitation of an imaging operation may have priority and the still image of alternate display (the third image) may be generated in association with the LV image (the second image). The details of the processing executed in S 1100 will be described below.

If the processing of S1100 ends, the procedure proceeds to S709. The camera MPU 1125 ends a series of photographing operations (including focus detection and display control) if OFF of the main switch is detected in S709. On the other hand, if OFF of the main switch is not detected in S709, the procedure returns to S702 and repeats the various types of processing described above. For example, if OFF of the main switch is not detected in the processing of S709, SW 1 is detected in the processing of S704, and SW2 is continuously detected in the processing of S707, a so-called continuous shooting (continuous photographing) in which the series of photographing operations are repeatedly performed is performed. The camera main body 1120 of the present embodiment acquires a still image for recording (a first image) a plurality of times at predetermined intervals if continuous photographing is performed regardless of the presence or absence of an LV display. Then, if continuous photographing is instructed during the LV display, at least an LV image can be displayed on the display unit 1126 while the still image for recording is acquired (that is, during continuous photographing).

Figure 14:
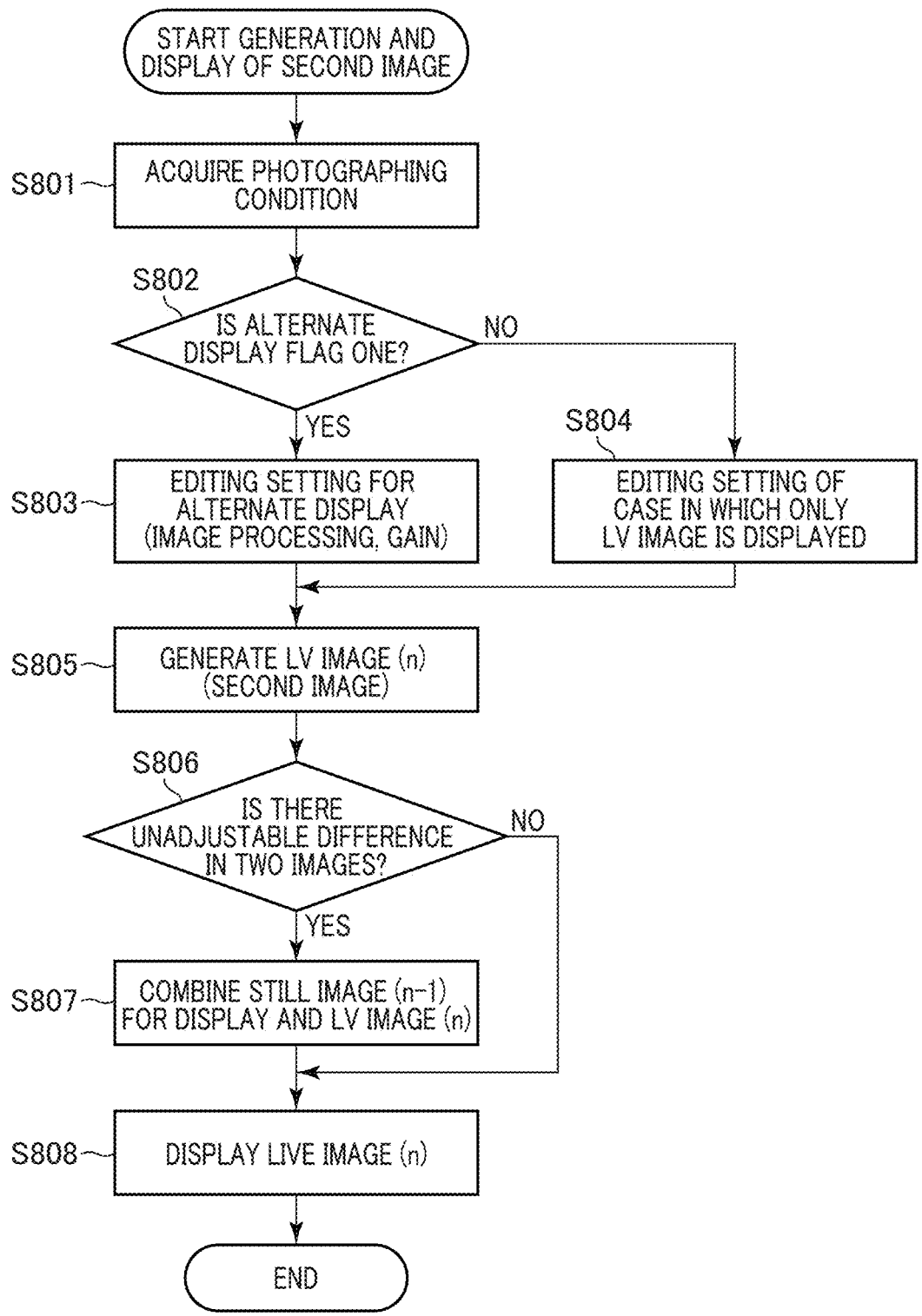
FIG. 14 is a flowchart of the generation and display processing of LV images in the third embodiment.

Next, the details of generation and display processing of the LV image (the second image) shown in FIG. 800 described above will be described with reference to FIG. 14. FIG. 14 is a flowchart which describes the generation and display processing of an LV image according to the third embodiment of the present invention. The flow chart shown in FIG. 14 shows processing executed in a second and subsequent imaging operations of continuous photographing, and description will be provided assuming that the second and subsequent imaging processing is $n^{th}$ (n is a natural number) imaging processing. In the following description, the number of times of corresponding imaging operations (for example, an $n^{th}$ time) is shown in parentheses.

First, the camera MPU 1125 acquires photographing conditions at the time of acquiring the image data (n) acquired in S702 in S801 and photographing conditions of a third image (n−1) which is a still image for alternate display acquired in S900.

Here, photographing conditions correspond to exposure conditions concerning exposure parameters such as exposure time (charge accumulation time), an aperture value (F value) related to an aperture diameter, gain information given to signals by ISO sensitivity adjustment and the like. The photographing conditions includes blur information, for example, shake information of an object output from a gyro-sensor (not shown), contrast information of the main object portion of an image, and the like.

Next, the camera MPU 1125 determines whether an alternate display flag indicating information regarding whether to perform the alternate display of the second image and the third image is one on the basis of the information acquired in the processing of S801 in S802. The setting of the alternate display flag will be described below with reference to FIG. 16.

If it is determined that the alternate display flag is one in the processing of S802, the procedure proceeds to S803, and the camera MPU 1125 performs editing setting of the second image (n) which is the LV image used for alternate display. Specifically, if the alternate display is executed, the camera MPU 1125 performs the editing setting of the LV image (the second image (n)) such that a difference between the third image (n−1) and the second image (n) acquired (generated) immediately before decreases, using the photographing condition obtained in S801. As this editing setting, gain adjustment, sharpness (blur) adjustment, low-pass processing (spatial frequency filter ring), and the like are performed on the image data acquired in the processing of S702. With this configuration, it is possible to alleviate the sense of discomfort given to a user between alternately displayed images.

Here, the gain adjustment in S803 described above will be described in details. If gain and exposure time are different between the third image (n−1) and the image data (n) acquired in the processing of S702, the camera MPU 1125 performs the editing setting such that the LV image (n) is gain adjusted according to the third image (n−1). For example, it is assumed that an exposure time for the third image (n−1) is ⅓₀ seconds and the gain is doubled. In this case, if an exposure time for image data (n) acquired in the processing of S702 is ⅟₁₅ seconds and the gain is 4 times, the second image (n) which is an LV image has an editing setting such that the gain is ¼ times with respect to the image data (n) acquired in the processing of S702.

If the gains are different between the first image (a still image for recording) and the second image (an LV image) by the exposure simulation setting to be described below, the third image (still image for display), an amount of gain adjustment according to the second image may be set as the editing setting of the third image (still image for display).

In addition, with regard to the sharpness processing and low-pass processing, even if the focus condition and shake state of the third image (n−1) and the image data (n) acquired by the processing of S702 are matched to exposure conditions, it is difficult to match both images due to the difference in acquisition period. Therefore, in the present embodiment, the blur state in the vicinity of a main object is analyzed to reduce the difference between the third image (n−1) and the second image (n). For example, if it is determined that the third image (n−1) is more blurred than the image (n) acquired in S702, the image (n) is low-pass processed to align the blur state of the second image (N) to the third image (n−1). Therefore, in the process of S 803, filter setting of the low pass processing is performed. The strength of the low-pass processing and the sharpness processing may be set by acquiring the contrast information, the spatial frequency component information, and the like in the vicinity of the main object. Alternatively, it may be set using camera shake information at the time of exposure. The processing executed in S803 may be only one of image processing and gain adjustment.

As described above, in the present embodiment, when the third image and the second image are alternately displayed, the second image displayed next to the third image is generated such that a difference from the third image decreases. With such a configuration, when both an LV image and a still image are alternately displayed, it is possible to reduce the sense of discomfort given to a user due to the difference between both images.

On the other hand, if the alternate display flag is not one (that is, the alternate display flag is zero) in S802, the procedure proceeds to S804, and the camera MPU 1125 performs editing setting for displaying only the second image on the display unit 1126. In this case, since there is no need to decrease the difference between the third image (n−1) and the second image (n), it is sufficient to set the editing setting such that brightness and contrast suitable for display are provided.

If various editing settings in the processing of S803 and S804 are completed, in S805, the camera MPU 1125 applies the set editing setting to the image (n) acquired in the processing of S702 to generate an LV image (a second image) corresponding to an $n^{th}$ imaging operation. Then, if the generation of the second image (n) is completed in S805, the procedure proceeds to S806, and the camera MPU 1125 determines whether there is a difference between the third image (n−1) and the second image (n), which cannot be adjusted even though gain adjustment, sharpness processing, and low-pass processing are executed. For example, if the F values are greatly different or the focus states are greatly different between the two images described above, the difference between the images cannot be adjusted in the sharpness processing and the low-pass processing.

If it is determined that there is an unadjustable difference in S806, the camera MPU 1125 combines the third image (n−1) and the second image (n) in S807 and newly generates the second image (n). For example, an average value of two images (for example, an output value or a luminance value of an image signal, and the like) is used for combining two images. Since the same processing is performed when generating the third image (n), which will be described below, moving averaging processing is performed on the two images in a chronological order. Accordingly, the difference between the two images can be reduced. On the other hand, in the case in which an object movement, a panning operation, or the like is performed, if the average processing of the two images is performed, an unnatural display in which moving parts in the image are shifted and overlapped is obtained. In such a case, this combination processing may not be performed.

Next, the camera MPU 1125 displays the second image (n) on the display unit 1126 in S808. Each of the processing described above may be executed by using an image signal before a conversion into image data, instead of being performed on each image output as image data. For example, in the processing of S807, an image signal corresponding to the third image (n−1) may be combined with an image signal corresponding to the second image (n).

Figure 15:
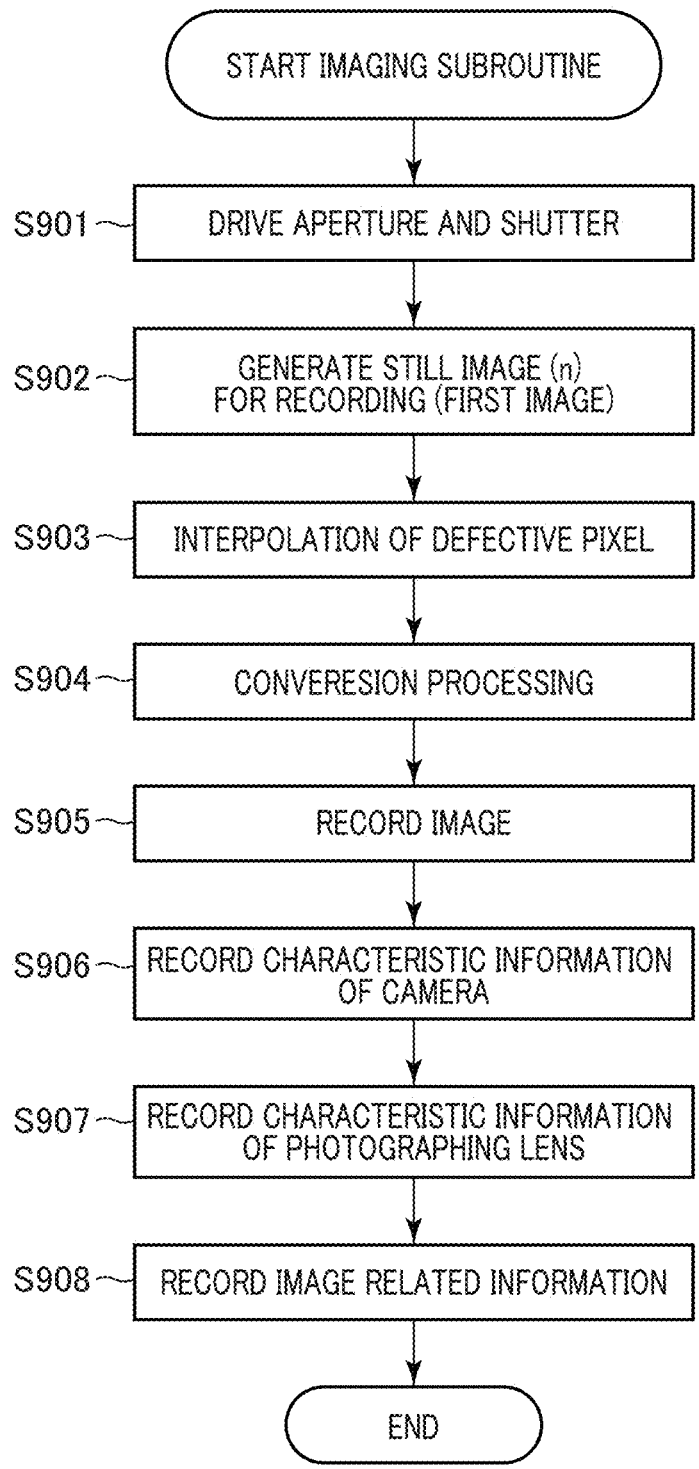
FIG. 15 is a flowchart of imaging subroutine processing in the third embodiment.

Next, the details of the imaging subroutine processing shown in S900 described above will be described with reference to FIG. 15. FIG. 15 is a flowchart which describes the imaging subroutine processing according to the third embodiment of the present invention. For example, in an imaging subroutine performed next to processing related to the generation and display of an LV image for an $n^{th}$ imaging operation in the flowchart illustrated in FIG. 14, a still image for recording (a first image) corresponding to the $n^{th}$ imaging operation is generated.

In S901, the camera MPU 1125 starts exposure control processing and sets imaging conditions (exposure time, F value, gain (imaging sensitivity)). This exposure control processing can be performed by the camera MPU 1125 based on the luminance information of image data, but any known technique may be used as a method for the exposure control processing. In the present embodiment, for example, in the $n^{th}$ imaging operation, the luminance information described above is acquired based on a still image for recording acquired in an $(n−1)^{th}$ imaging operation. Alternatively, the luminance information may be acquired based on the LV image acquired in the $n^{th}$ imaging operation.

In addition, the camera MPU 1125 controls the aperture actuator 1112 on the basis of a set F value and set exposure time and controls the operation of the shutter 1102 serving as the aperture in S901. Moreover, the camera MPG 1125 controls the driving of the imaging element drive circuit 1123 on the basis of the set exposure time, and executes charge accumulation.

If the charge accumulation ends, the camera MPU 1125 controls the operation of the imaging element drive circuit 1123 to acquire an image data (first image signal) corresponding to a still image by reading a previously accumulated charge in S902. Then, the camera MPU 1125 acquires a still image for recording (first image) based on the first image signal. Although the reading of the first image signal is the reading of so-called all pixels, the reading line of the imaging element 1122 may be set so as to obtain high pixel image data as a still image for recording. As the camera main body 1120 of the present embodiment, a still image for display (third image) may be generated on the basis of the still image for recording (the first image), and may also be generated on the basis of the first image signal at the same time as the still image for recording. In this case, each of the still image for recording and the still image for display is generated on the basis of the first image signal. The LV image and the still image in the present embodiment are different types of images having different numbers of pixels of the imaging element on which reading is performed as described above.

Next, the camera MPU 1125 performs defective pixel correction processing on the read image data via the image processing circuit 1124 in S903. In S904, the camera MPU 1125 applies various types of image processing such as demosaic processing (color interpolation), white balance processing, γ correction processing (gradation correction), color conversion processing, edge emphasis processing, and the like, coding processing, and the like to the image data after the defective pixel correction processing via the image processing circuit 1124. The camera MPU 1125 records a data file corresponding to the still image for recording (first image) in the memory 1128 in S905.

Next, the camera MPU 1125 records the characteristic information of the camera main body corresponding to the still image for recording which is recorded in the processing in S905 in the memory 1128 and a memory provided in the camera MPU 1125 in S906. Here, the characteristic information of the camera main body includes exposure conditions, image processing information, information on the light receiving sensitivity distribution of imaging pixels and focus detection pixels of the imaging element 1122, vignetting information on photographing light flux, information on flange back, manufacturing error information, and the like. Since the light receiving sensitivity distribution information of the imaging element 1122 is information dependent on an on-chip microlens ML and a photoelectric conversion unit PD, information on these members may be recorded.

In S907, the camera MPU 1125 records the characteristic information of a lens unit corresponding to the still image for recording which is recorded in the processing of S905 in the memory 1128 and the memory provided in the camera MPU 1125. Here, the characteristic information of a lens unit corresponds to information on an exit pupil, information on a focal distance and an F value at the time of imaging, aberration information of an optical system, manufacturing error information, and the like.

Next, the camera MPU 1125 records image related information on a previously acquired still image for recording in the memory 1128 and the memory provided in the camera MPU 1125 in S908. The image related information corresponds to information on a focus detection operation before imaging, object movement information, information on the accuracy of a focus detection operation, and the like.

Figure 16:
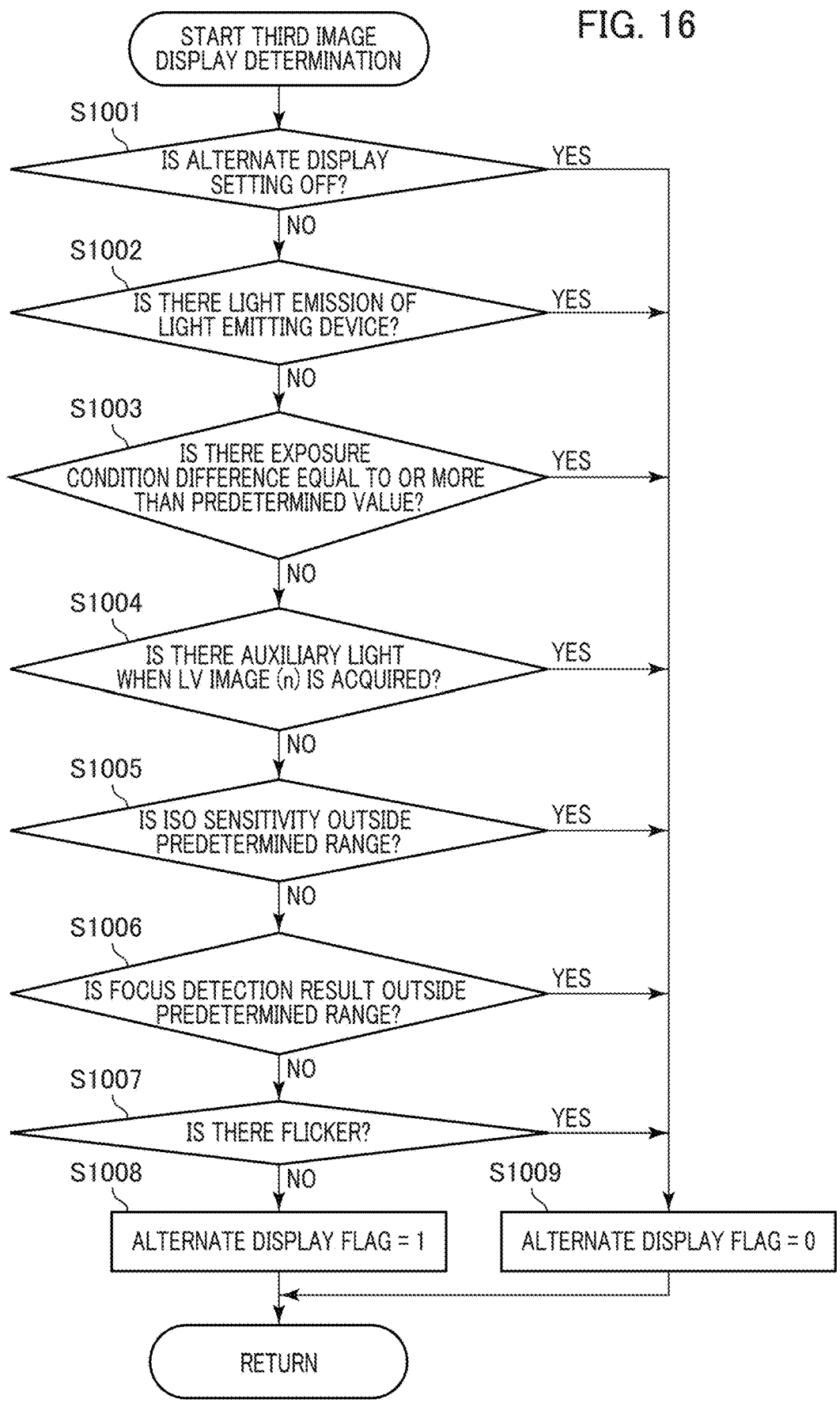
FIG. 16 is a flowchart of display determination processing in the third embodiment.

Next, the details of third image display determination processing shown in S1000 described above will be described with reference to FIG. 16. FIG. 16 is a flowchart which describes the display determination processing of the still image for display according to the third embodiment of the present invention. For example, a still image for display (third image (n)) corresponding to the $n^{th}$ imaging operation is generated in the third image display determination processing performed subsequent to the generation and display processing of the still image for recording (first image) regarding the $n^{th}$ imaging operation in a previous imaging subroutine.

In S1001, the camera MPU 1125 determines whether the alternate display setting is turned off by a user. As the alternate display setting, for example, it is possible to turn on or off the alternate display setting displayed on a menu screen by a user manually operating an operation member. If the alternate display setting is turned off, the procedure proceeds to S1009 and the camera MPU 1125 sets the alternate display flag to zero as information indicating that an alternate display is not performed.

Next, if the alternate display is set to be ON in S1001, the procedure proceeds to S1002 and the camera MPU 1125 determines whether light emission (illumination) towards an object is being performed by a light emitting device (not shown) when a still image for recording (first image) is photographed. When the object is illuminated by the light emitting device, the object is illuminated in the still image for recording (first image), but the object is not illuminated in the LV image (second image), and thus there is a large difference in brightness between both images. Therefore, in this case, alternate display is not performed to suppress the sense of discomfort given to a user by the alternate display of images with largely different brightness. If the amount of light emitted by the light emitting device is small, the difference in brightness between both images can be reduced by gain adjustment or the like, and thus the alternate display may be performed in such a case.

Next, the camera MPU 1125 determines whether there is a difference equal to or greater than a predetermined value in each exposure condition between the first image (n) and the second image (n) in S1003. As described above, the difference in exposure condition can be reduced by the gain adjustment and the combination processing of the two images, but it is difficult to reduce the difference if the difference between both images is large. For example, a case in which the first image is acquired under a condition in which the aperture is made small (small aperture) in long second exposure performed by a so-called slow shutter is assumed. In this case, the second image and the first image may be acquired under the same exposure condition, but with regard to an LV image, there is a problem that it takes a long time to display update time onto the display unit 1126 and focus detection accuracy becomes deteriorated. Therefore, if it is determined in the processing of S1003 that there is a difference in exposure condition equal to or greater than the predetermined value, setting is provided such that the alternate display is not performed.

Next, the camera MPU 1125 determines whether auxiliary light for assisting the focus detection processing is emitted when the LV image (second image) is acquired in S1004. Generally, the auxiliary light is a light projection for assisting focus detection, and since an illumination range by light projection is narrow with respect to an imaging range or a color is biased only to a specific range, the auxiliary light is not suitable for the acquisition of a still image. Therefore, if the above-described auxiliary light is emitted when the LV image is acquired, there is a large difference in brightness between the still image and the LV image, and it is difficult to compensate for the difference. Therefore, when auxiliary light for assisting focus detection is emitted at the time of the acquisition of the LV image (second image) in the $n^{th}$ imaging operation, setting is provide such that the alternate display is not performed.

Next, the camera MPU 1125 determines whether the ISO sensitivity (gain) of each of the still image for recording (first image (n)) and the LV image (second image (n)) is a value falling outside a predetermined range in S1005. As described above, a still image and an LV image have different methods of reading signal values. For example, since the LV image, with respect to the still image, is read by adding and compressing signals of the same color in the horizontal direction of the imaging element by so-called thinning reading, hue and the like of the both images may be different. In this case, there is a large difference between the still image and the LV image (for example, a difference in noise amount) according to the ISO sensitivity setting value. Therefore, in the camera main body 1120 of the present embodiment, a range (threshold value) in which alternate display can be executed is provided, and if the ISO sensitivities of the still image and the LV image are within the range, it is determined that the difference between both images is small and the alternate display is executed. On the other hand, if any of the ISO sensitivities of the still image and the LV image is a value falling outside the range, it is determined that the difference between both images is large and the alternate display is not executed.

In the present embodiment, a configuration in which the ISO sensitivities of the still image for recording and the LV image are compared with the predetermined range (threshold) regarding the ISO sensitivity has been described, but the present invention is not limited thereto. For example, it is determined whether the difference (absolute value) between the ISO sensitivities of continuously acquired LV image (n) and still image for recording (n) is equal to or greater than a predetermined threshold value, and, if the difference in ISO sensitivity of both images is smaller than the predetermined value, the alternate display may be executed.

Next, the camera MPU 1125 determines whether the amount of shift (phase difference) calculated in S703 is a value falling outside the predetermined range in S1006. If it is determined that the amount of shift is a value falling outside the predetermined range, it is determined that the amount of shift is large and the alternate display is not executed.

Next, the camera MPU 1125 determines whether there is flicker detection performed in S702 in S1007. If there is flicker, since photographing is performed under an exposure condition in which flicker does not occur, it is determined that there is a difference in exposure condition equal to or larger than a predetermined value and the alternate display is not executed. If a photographing mode for reducing the influence of flicker is set, an alternate display flag may be set to zero and the alternate display may not be performed.

If each of the determinations in S1001 to S1007 described above is a NO determination, the camera MPU 1125 sets a flag indicating the execution of the alternate display (alternate display flag=1) as an alternate display flag in S1008. Only one of the determinations of S1001 to S1007 described above may be executed or excluded, and thereby presence of absence of the alternate display may be determined on the basis of a result of the determination. For example, the alternate display may be executed if the alternate display setting is ON regardless of other conditions.

Figure 17:
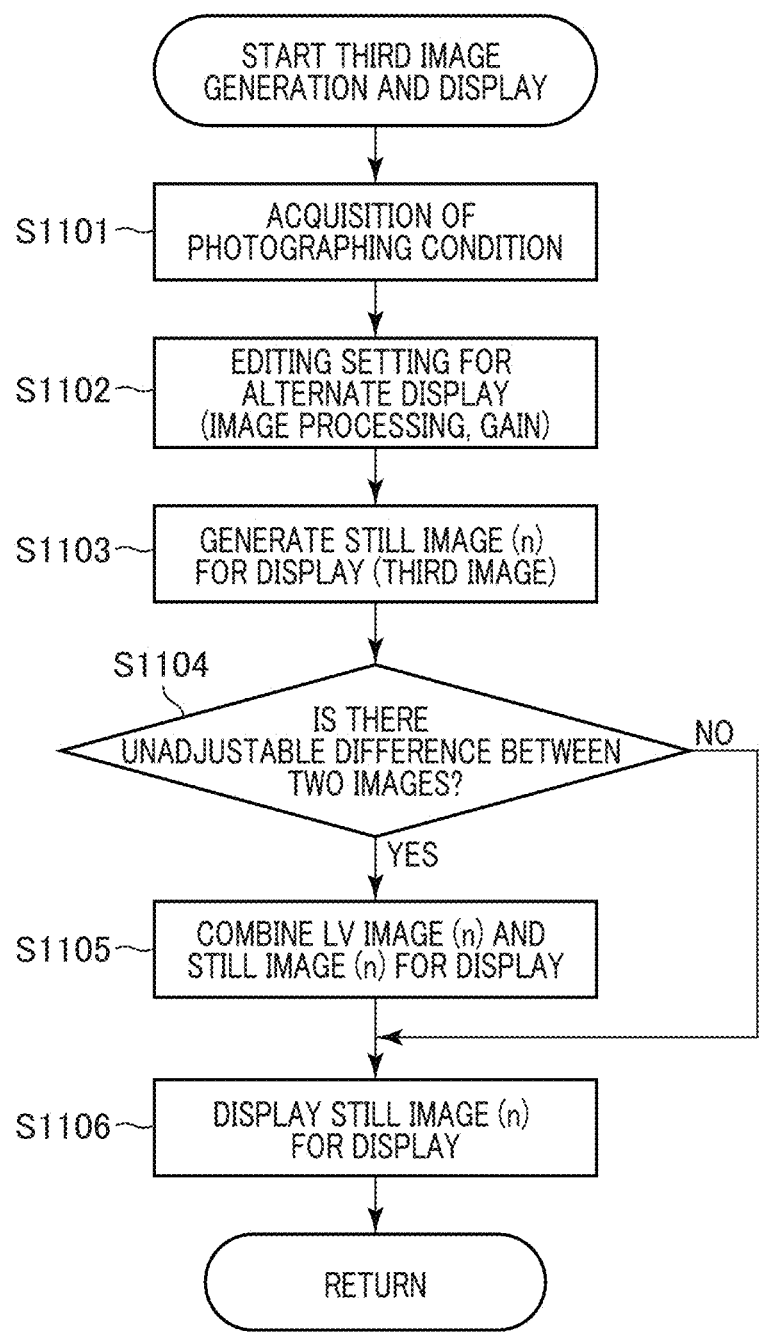
FIG. 17 is a flowchart of the generation and display processing of a still image in the third embodiment.

Next, the details of the generation and display processing of the still image for display (third image) shown in S1100 described above will be described with reference to FIG. 17. FIG. 17 is a flowchart which describes the generation and display processing of the still image for display according to the third embodiment of the present invention. The flowchart shown in FIG. 17 will also be described assuming the $n^{th}$ (n is a natural number) imaging operation of the second and subsequent imaging operations in continuous photographing.

First, in S1101, the camera MPU 1125 acquires a photographing condition for acquiring the image data (n) acquired in S702 and a photographing condition for acquiring the third image (n−1) which is the still image for alternate display acquired in S900. This processing is the same as S801 described above.

In S1102, the camera NPU 1125 performs editing setting of the third image used for alternate display. Specifically, in the case of executing alternate display, the editing setting of the still image for display (third image) is performed such that a difference between the third image (n−1) and the second image (n) decreases by using the photographing conditions obtained in S1101. In the processing of S803 described above, it is described that the difference between the still image for display (n−1) and the LV image (n) is reduced to suppress the sense of discomfort given to a user. On the other hand, in the processing of S1102, the still image for display (n) is acquired in accordance with the LV image (n) to reduce the difference between the LV image (n) and the still image for display (n−1) to suppress the sense of discomfort given to a user. With such a configuration, even if the alternate display is performed in order of the still image for display (n−1), the LV image (n), and the still image for display (n), it is possible to suppress the sense of discomfort given to a user by reducing a difference between continuously displayed images. Since the editing setting in the processing in S1102 is substantially the same as the processing in S803 described above, the description thereof will be omitted.

Next, in S1103, the camera MPU 1125 generates a third image (the still image for display (n)) with respect to the first image (still images (n) for recording) based on the editing setting determined in S1102. Then, the camera MPU 1125 determines whether there is a difference that cannot be adjusted even if the gain adjustment, sharpness processing, and low-pass processing are executed between the second image (n) and the third image (n) in S1104. Since this determination is substantially the same as in S806 described above, the description thereof will be omitted.

If it is determined in S1104 that there is an unadjustable difference, the camera NPU 1125 combines the second image (the LV image (n)) and the third image (the still image for display (n)) in S1105, and newly generates a third image (n). Since the method of combining the two images is substantially the same as in S807, the description thereof will be omitted.

Next, the camera MPU 1125 displays a third image (still image for display (n)) on the display unit 1126 in S1106. As described above, each processing shown in FIG. 17 may be executed using an image signal before the conversion into image data, instead of being performed on each image output as image data.

Figure 18:
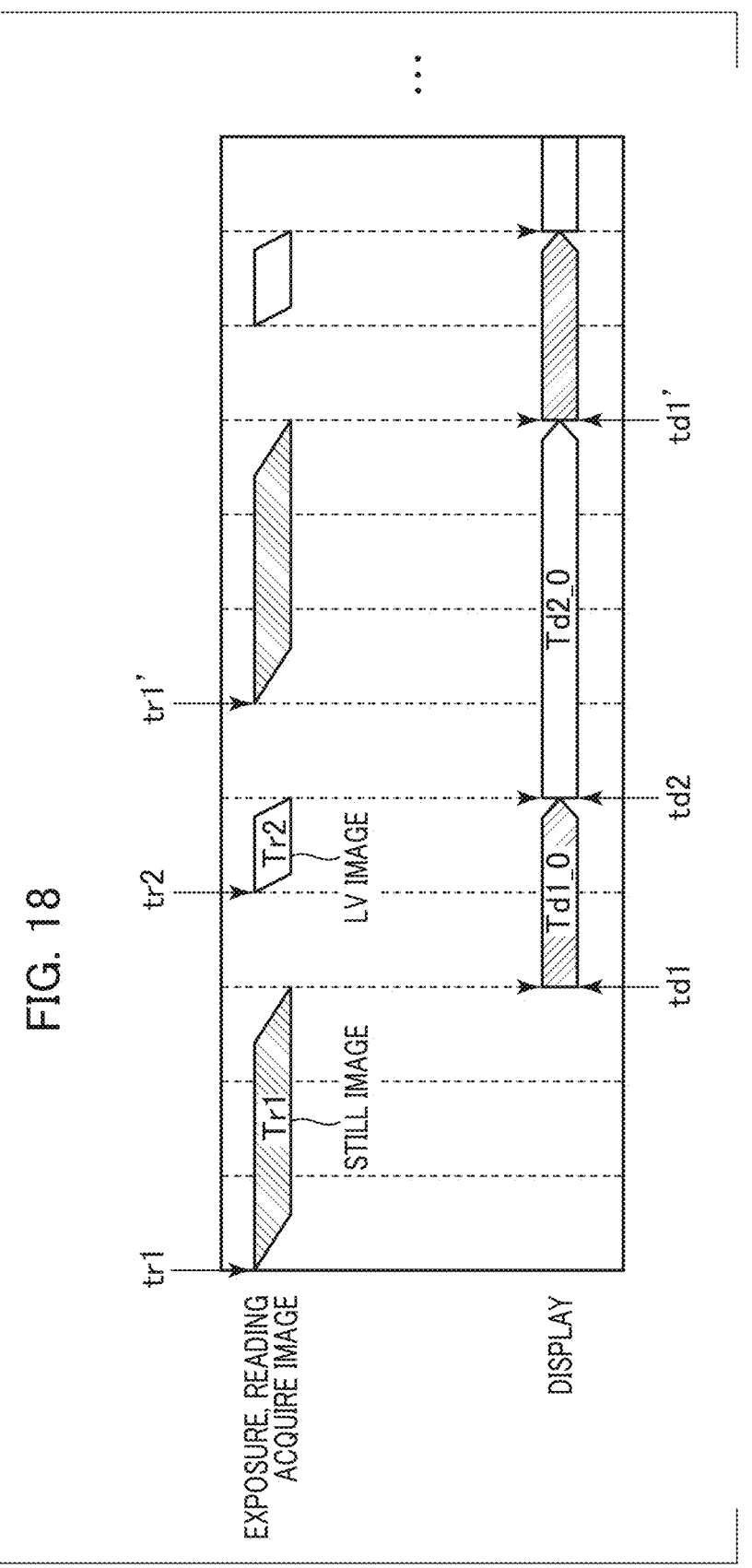
FIG. 18 is a timing chart when an LV image and a still image are displayed.
Figure 19:
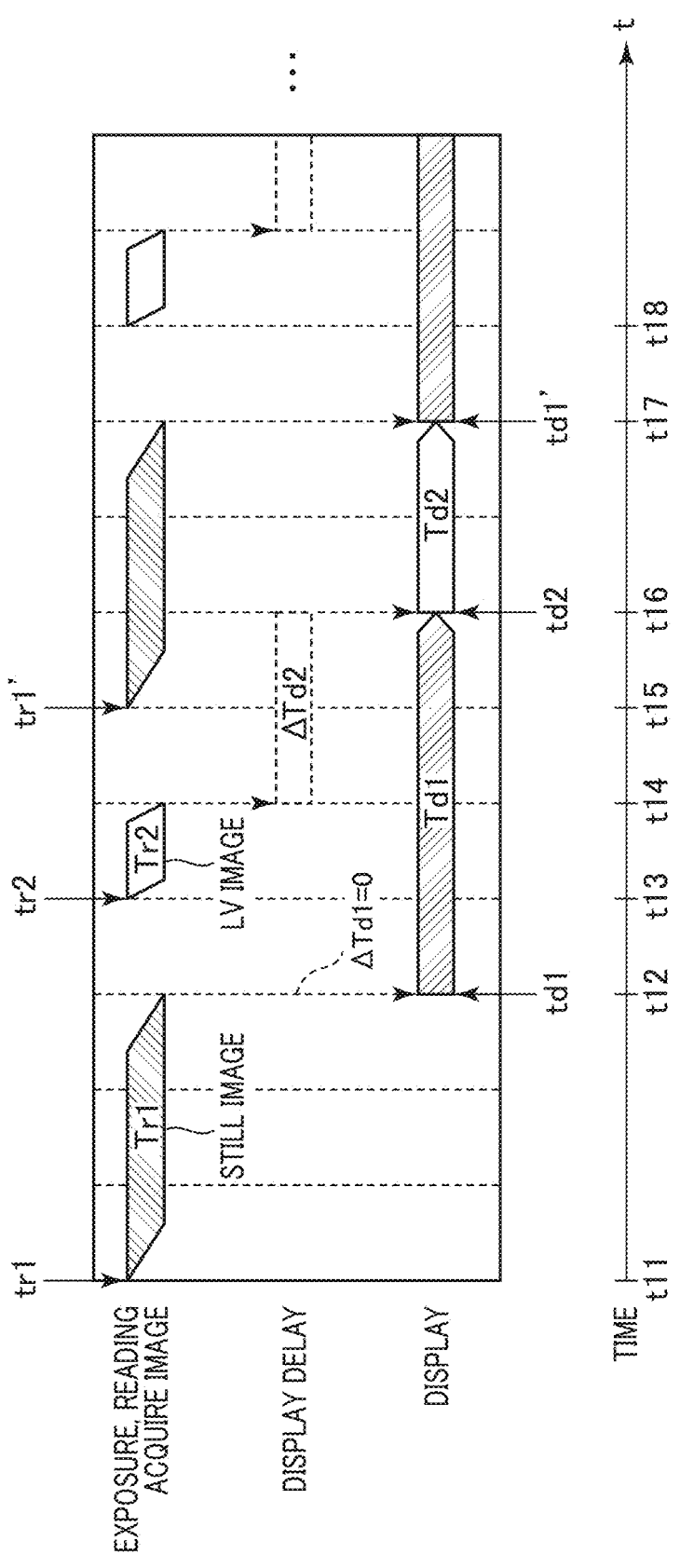
FIG. 19 is a timing chart when an LV image and a still image are alternately displayed.
Figure 20:
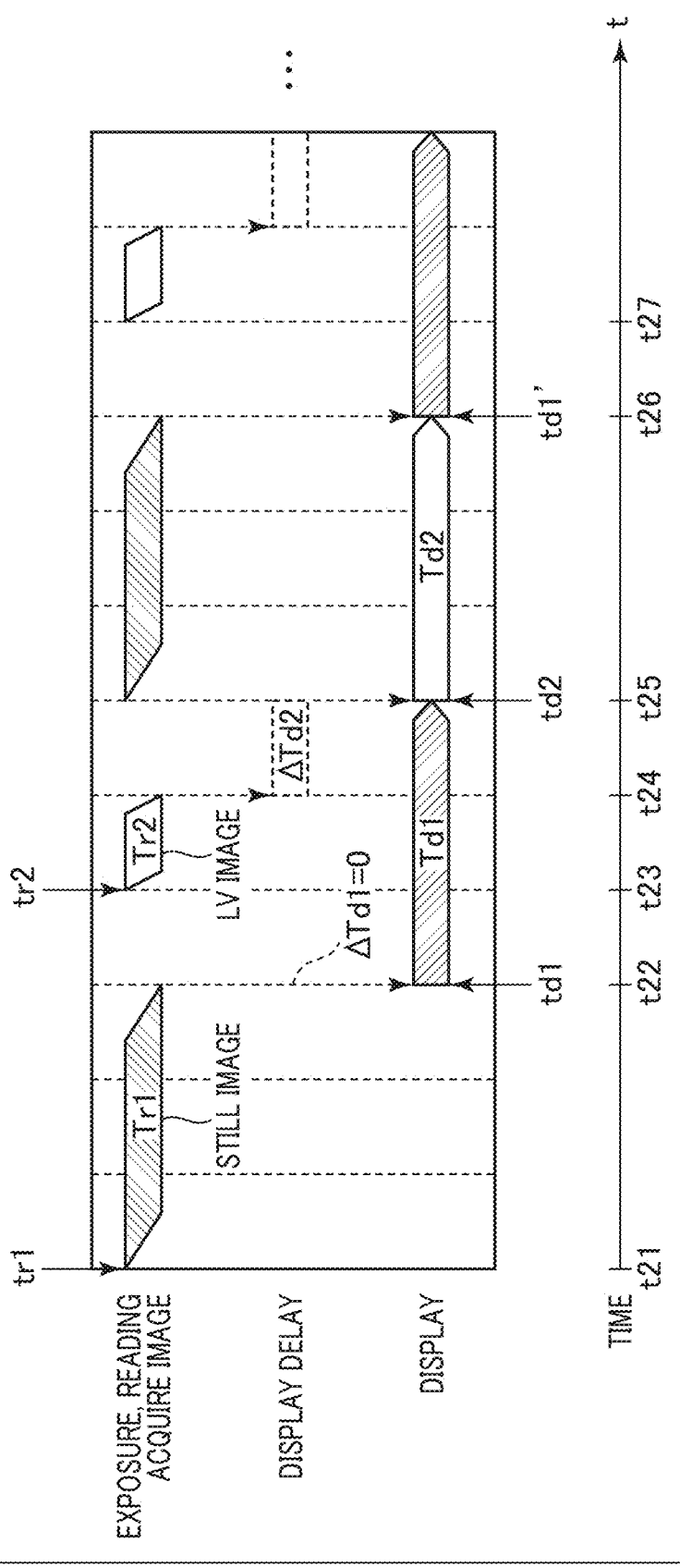
FIG. 20 is a timing chart when an IV image and a still image are alternately displayed.

Next, the alternate display operation of the LV image and the still image described above will be described with reference to FIGS. 18 to 20. FIG. 18 is a diagram which illustratively describes a timing chart in the case of performing the alternate display and displaying the LV image and the still image immediately after image generation. FIG. 19 is a case in which the alternate display is performed, and is a diagram which illustratively describes a timing chart according to a first method in the case of alternately displaying the LV image and the still image in view of a predetermined display delay time. Moreover, FIG. 20 is a case in which the alternate display is performed, and is a diagram which illustratively describes a timing chart according to a second method in the case of alternately displaying the LV image and the still image in view of a predetermined display delay time. It is assumed that various types of operations and processing in the following description are executed by the camera MPU 1125.

In FIGS. 18 to 20, blocks of slashed lines indicate processing related to still images, and white blocks indicate processing related to an LV image. Tr1 and Tr2 indicate the time of exposure, reading, and image acquisition of still images and an LV image (the time required from the start of exposure to the completion of acquisition). tr1 and tr1' indicate the exposure start time of still images, and tr2 indicates the exposure start time of an LV image. td 1 and td 1' indicate the display start time of still images, and td2 indicates the display start time of an LV image.

Further, in FIGS. 18 to 20, Td1_0 indicates the display time of a still image and Td2_0 indicates the display time of an LV image. In addition, ΔTd1 in FIGS. 19 and 20 represents the display delay time of a still image (time from the completion of acquisition to the display start of a still image), and ΔTd2 is the display delay time of an LV image (time from the completion of acquisition to the display start of an LV image). In the examples of FIGS. 19 and 20, ΔTd 1 is zero, but ΔTd 1 is not limited to be zero in the present embodiment. T11 to 18 and t21 to t27 in FIGS. 19 and 20 represent time in the respective drawings. In the figure, the time is shown up to t18 or t27. However, if it is determined that the continuous photographing continues, continuous photographing processing continues even after the illustrated time.

First, a specific example in the case of performing alternate display without display delay will be described with reference to FIG. 18. In this case, still images (for recording and for display) are generated first at the time of Tr1 from the timing of tr1. Then, without displaying delay, a still image for display is displayed in time Td1_0 from a timing indicated by td1 without display delay.

Next, an LV image is generated at time Tr2 from a timing of tr2. Then, the generated LV image is displayed in time Td2_0 from a timing of td2 without display delay. Thereafter, the still image for display and the LV image are alternately displayed in the same procedure.

Next, a specific example in the case of performing alternate display in view of a predetermined display delay time on the basis of the first method will be described with reference to FIG. 19. In the first method, the display delay time is set such that the time from the acquisition timing to the display start timing of the still images is substantially equal to the time from the acquisition timing to the display start timing td 2 of the LV image. That is, the first display delay time ΔTd 1 and the second display delay time ΔTd2 are set such that the time from the timing tr1 to the timing td1 is substantially equal to the time from the timing tr2 to the timing td2. The display time Td1 of the still image for display and the display time Td2 of the LV image are calculated based on the set first display delay time ΔTd1 and the set second display delay time ΔTd2.

More specifically, the camera MPU 1125 acquires the time Tr1 and Tr2 from the start of exposure to the completion of acquisition of each of the still image and the LV image on the basis of the photographing condition set in S801. Then, the camera MPU 1125 sets the first display delay time ΔTd1 for the still image to be zero (this may be other than zero as described above). Then, the camera MPU 1125 calculates the second display delay time ΔTd2 for the LV image according to the following Equation.

$$Tr2+\Delta Td2 = Tr1+\Delta Td1$$

$$\Delta Td2 = Tr1+\Delta Td1-Tr2 = Tr1-Tr2$$

Next, the camera MPU 1125 calculates the display times Td1 and Td2 of the still images and the LV image. Specifically, the camera MPU 1125 acquires the display times Td1_0 and Td2_0 (refer to FIG. 18) in the case in which the display delay time ΔTd1 and ΔTd2 do not exist, on the basis of the photographing conditions set in S801 and S1101. Then, the camera MPU 1125 calculates display times Td1 and Td2 according to the following Equation.

$$Td1 = Td1\_0 + (\Delta Td2 - \Delta Td1) = Td1\_0 + \Delta Td2$$

$$Td2 = Td2\_0 + (\Delta Td1 - \Delta Td2) = Td1\_0 - \Delta Td2$$

Next, the camera MPU 1125 sets a display start time (timing) and a display time of a still image for display and instructs a display on the basis of the calculated first display delay time ΔTd1 and display time Td1. Specifically, still images having started to be acquired from the time tr1 starts a display of the still image for display at a time t12 and displays it until a time t16. Since substantially the same processing is executed for an LV image, the description thereof will be omitted. With the configuration described above, the time from the acquisition time tr1 of still images to the display start time td1 of still images is substantially equal to the time from the acquisition time tr2 of an LV image to the display start time td2 of the LV image, and thus an image display without the sense of discomfort is possible.

Next, a specific example in the case of performing alternate display in view of predetermined display delay time based on the second method will be described with reference to FIG. 20. In the second method of the present embodiment, the first display delay time ΔTd1 related to still images (for display) and the second display delay time ΔTd2 related to an LV image are set such that the display time Td1 of still images and the display time Td 2 of an LV image are substantially equal to each other. Specifically, in the case of using the second method, a display delay is set only for images having a short acquisition time without providing a display delay for images requiring long acquisition time. That is, the display time of each image is controlled such that the first display delay time ΔTd1 is set to zero and the display time Td1 of the still image for display and the display time Td2 of the LV image are substantially equal to each other. That is, the second method differs from the first method described above in that the display times Td1 and Td2 of a still image and an LV image and the display start time (timing) td2 of an LV image are different.

The second display delay time ΔTd2 for an LV image is calculated using the following Equation 4 together with the Equation described above.

$$Td1 = Td2 \quad (4)$$

$$\Delta Td2 = Td1 - Td1\_0 = Td2\_0 - Td2$$

$$= \frac{Td2\_0 - Td1\_0}{2} \quad (\Delta Td1 = 0, \; Tr1 > Tr2)$$

Next, the camera MPU 1125 calculates the display times Td1 and Td2 of a still image and an LV image. Specifically, the camera MTU 1125 acquires the display times Td1_0 and Td_0 (refer to FIG. 18) in the case in which the display delay times ΔTd1 and ΔTd2 do not exist, on the basis of the photographing conditions set in S801 and S1101. Then, the camera MPU 1125 calculates the display times Td1 and Td2 according to the following Equation 5 on the basis of the first display delay time ΔTd1=0 and the second display delay time ΔTd2 calculated by the Equation 4 described above.

$$Td1 = Td1\_0 + (\Delta Td2 - \Delta Td1) = Td1\_0 + \frac{Td2\_0 - Td1\_0}{2} \quad (5)$$

$$Td2 = Td2\_0 + (\Delta Td1 - \Delta Td2) = Td2\_0 - \frac{Td2\_0 - Td1\_0}{2}$$

Next, the camera MPU 1125 sets a display start time (timing) and a display time of a still image for display and instructs a display using the calculated first display delay time ΔTd1 and display time Td1. Specifically, still images having started to be acquired from the time tr1 start the display of a still image for display at a time t22, and display it until a time t25. Since substantially the same processing is executed for an LV image, the description thereof will be omitted. With the configuration described above, since the display time Td1 of a still image for display and the display time Td2 of an LV image become substantially equal, it is possible to display an image without the feeling of discomfort.

The imaging apparatus of the present embodiment, if an alternate display is executed, may use any one of various methods as shown in each of the timing charts described in FIGS. 18 to 20. In particular, it is preferable to adjust the display delay of still images and LV images by executing an alternate display using the first and second methods described above, thereby suppressing the sense of discomfort given to a user. An alternate display may be executed by combining the first method and the second method.

As described above, according to the present embodiment, if it is considered that the difference between images used for an alternate display is large on the basis of various conditions, camera main body 1120 does not execute processing of sequentially acquiring a plurality of images and sequentially displaying the images (alternate display). In other words, the camera main body 1120 executes processing of sequentially acquiring a plurality of images and sequentially displaying the images (alternate display) if it is considered that the difference between images used for an alternate display is small on the basis of various conditions. Therefore, the camera main body 1120 of the present embodiment can determine whether to execute an alternate display on the basis of the difference between the images used for the alternate display, and thus it is possible to suppress the sense of discomfort given to a user from increasing by executing an alternate display.

In the embodiment described above, an example in which still images and LV images are alternately acquired one by one has been shown, but the number of images to be acquired as each image is not limited thereto. The imaging apparatus according to the present invention may acquire a second image (LV image and the like) at least once while still images are acquired at predetermined intervals. For example, the imaging apparatus may acquire a plurality of LV images while acquiring still images. In this case, the imaging apparatus may repeat (update) the generation and display of LV images a plurality of times and newly display a still image for display after displaying the still image for display on the display unit 1126. If exposure time at the time of acquiring LV images with respect to still images is short, the exposure time may be set to be substantially the same as still images, for example, by adding (frame addition) the plurality of LV images described above. Then, if the frame addition described above is performed, the frame addition can be realized without impairing a display update interval by performing the moving average processing between respective LV images.

Fourth Embodiment

Figures 21A, 21B:
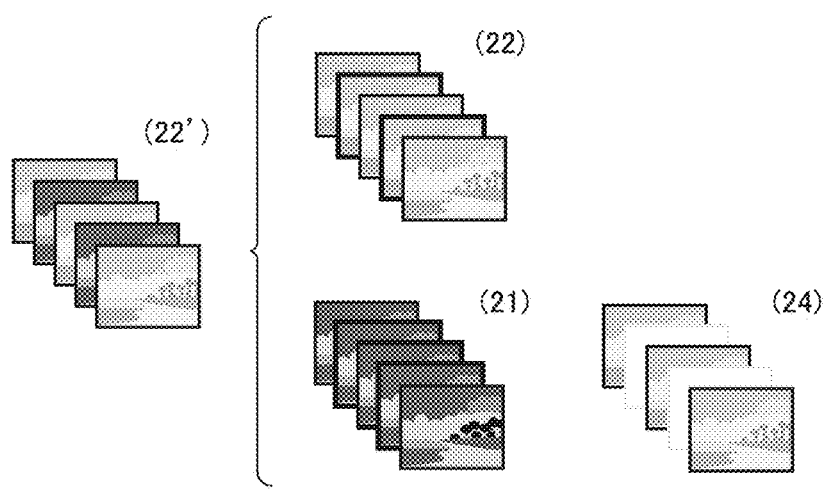
FIGS. 21A and 21B are diagrams of an alternate display method in a fourth embodiment.
Figure 22:
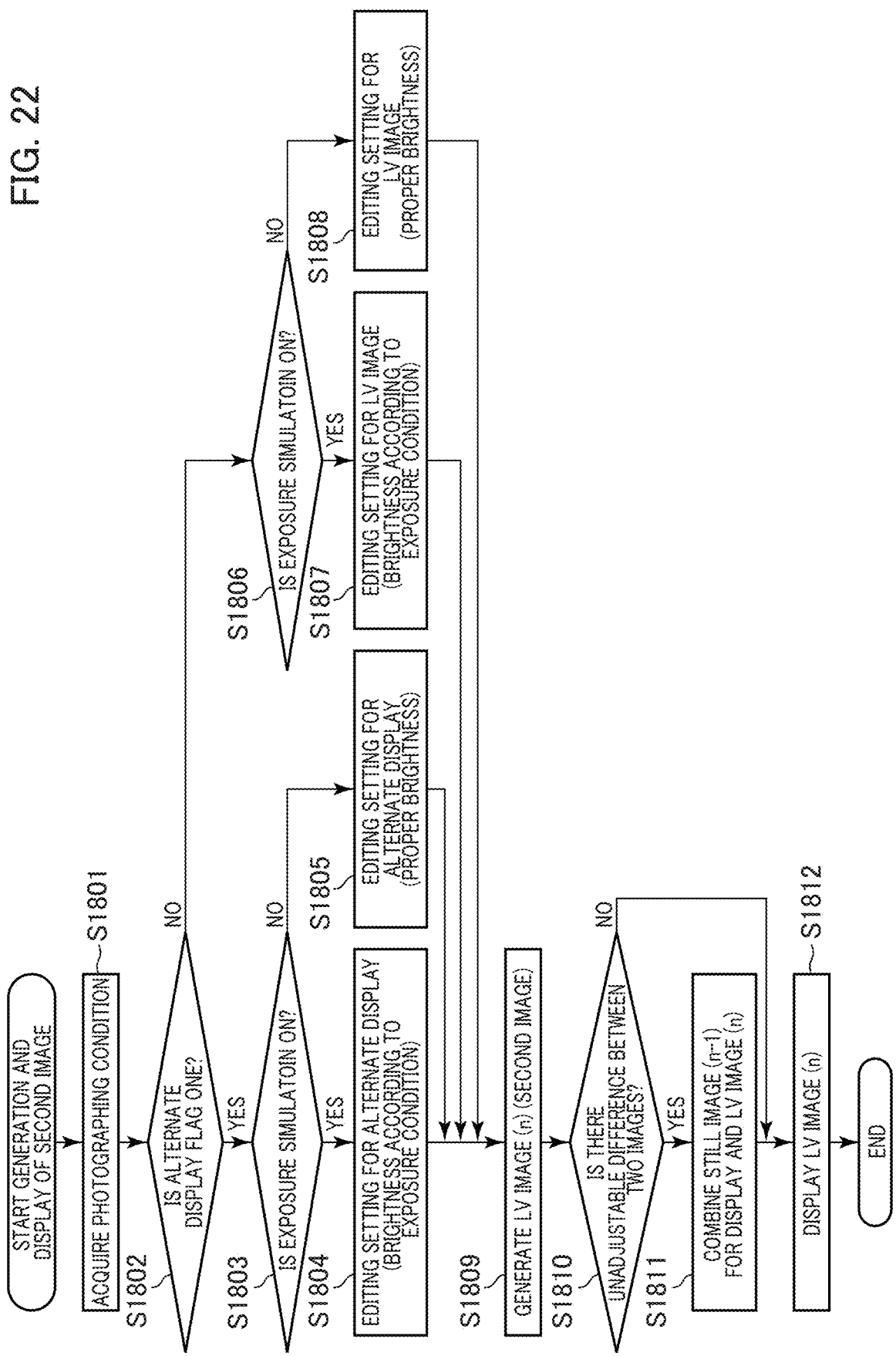
FIG. 22 is a flowchart of the generation and display processing of an LV image in the fourth embodiment.
Figure 23:
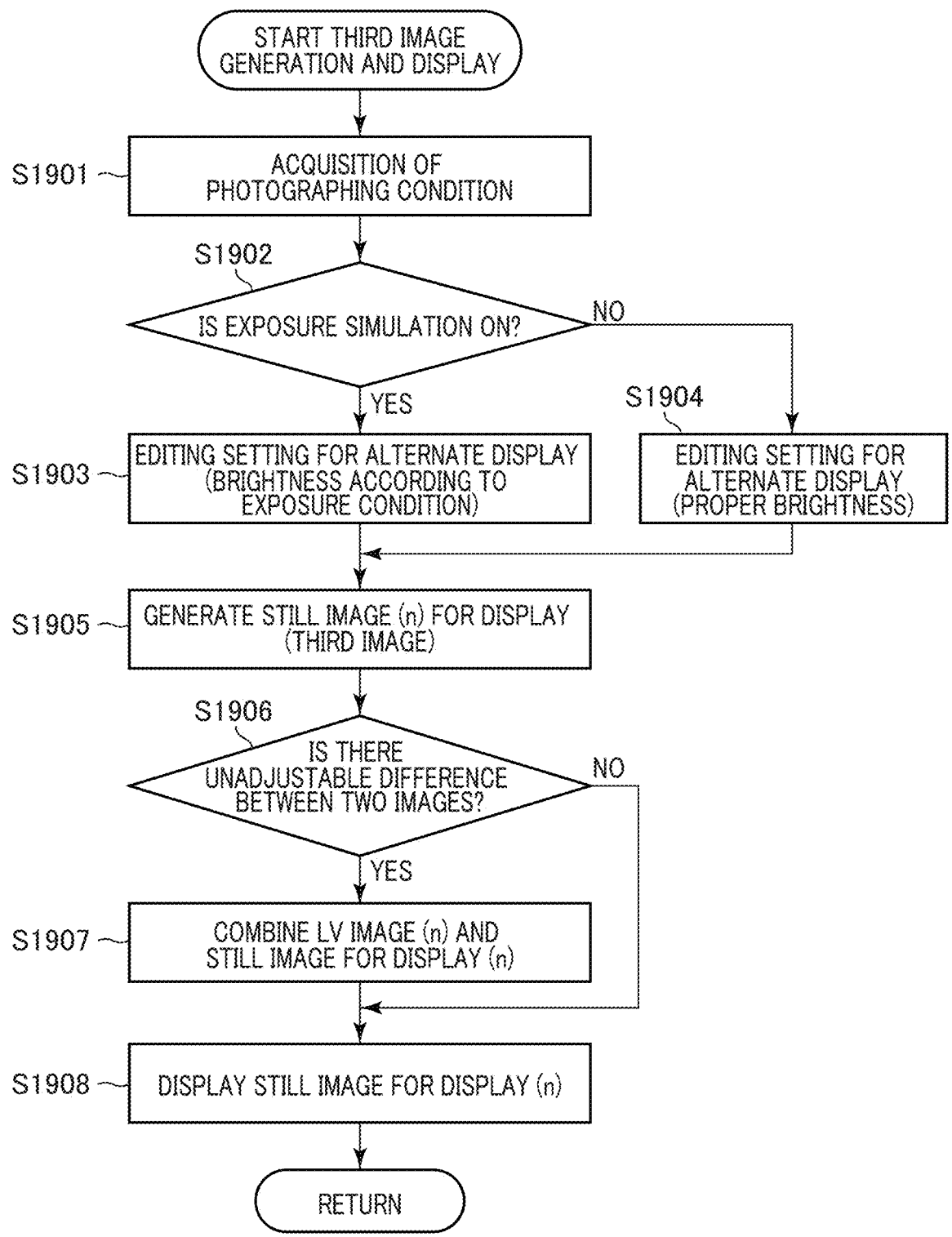
FIG. 23 is a flowchart of the generation and display processing of a still image in the fourth embodiment.

Next, a fourth embodiment of the present invention will be described with reference to FIGS. 21 to 23. In the fourth embodiment, a method of an alternate display in accordance with setting relating to an exposure simulation function will be described. Specifically, in the present embodiment, if an alternate display is executed, control at the camera main body 1120 for decreasing a difference in brightness between continuous images used for the alternate display regardless of ON or OFF of exposure simulation setting will be described.

Here, the exposure simulation function is a function of simulating an image acquired in the exposure conditions (for example, exposure parameters such as exposure time, an aperture value, and a gain) set by a user before actual present imaging of an object. Therefore, this exposure simulation setting is turned on, and thereby the user can confirm in advance still images that can be acquired in the present imaging.

In addition, there are cases in which imaging is performed with inappropriate brightness for an object by the intention of a user. In this case, if the exposure simulation setting is turned on, the LV display is performed according to still images that can be acquired under the set exposure conditions. Therefore, for example, if a user acquires still images under the exposure conditions on the underside, LV images become darker, and visibility deteriorates. In such a case, it is possible to display an image with brightness suitable for the visibility of a user by turning off the exposure simulation setting.

Hereinafter, with reference to FIG. 21, focus detection processing, imaging processing, and display processing according to the present embodiment will be described. The description of constituents substantially the same as in the third embodiment described above will be omitted, and the same reference numerals will be given. FIG. 21 is a diagram which illustratively describes an alternate display method based on the exposure simulation setting and an alternate display-related setting according to the fourth embodiment of the present invention. FIG. 21A is a diagram which illustratively describes images displayed on the display unit 1126 in accordance with the alternate display setting and the exposure simulation setting according to the fourth embodiment of the present invention. It is assumed in FIG. 21 that LV images displayed on the display unit 1126 at the time of LV photographing and still images for display are alternately displayed. Moreover, in FIG. 21, images enclosed by a thick frame are shown as still images for display (third image), and the other images indicate LV images.

First, a case in which the alternate display setting is ON and the exposure simulation setting is ON will be described. In this case, the brightness of image used for an alternate display is different depending on an exposure condition set by a user. For example, when the exposure condition set by a user is appropriate brightness (exposure) for an object, as shown by (11) illustrated in FIG. 21A, images with brightness corresponding to a proper exposure are used for an alternate display. Moreover, for example, when the exposure condition set by a user is the brightness (exposure) on the underside for an object, as shown by (21) illustrated in FIG. 21A, images with brightness corresponding to an exposure on the underside are alternately used. If exposure simulation is turned on, the brightness of LV images is adjusted so as to match the brightness of still images.

Next, a case in which the alternate display setting is ON and the exposure simulation setting is OFF will be described. In this case, since the exposure simulation setting is turned off, it is not necessary to adjust the brightness of the images used for an alternate display according to the exposure condition set by a user. Therefore, in this case, as shown by (12) illustrated in FIG. 21A or (22) illustrated in FIG. 21A, images corresponding to appropriate brightness (exposure) giving priority to the visibility of a user are used for an alternate display regardless of the exposure condition. In this case, the brightness of still images for display is adjusted so as to match the brightness of LV images.

Next, a case in which the alternate display setting is OFF and the exposure simulation setting is ON will be described. In this case, since the alternate display setting is turned off, still images (third image) for display are not displayed on the display unit 1126 (it is illustrated by a dotted line in FIG. 21A). Then, since the exposure simulation setting is turned on, image processing performed on LV images differs according to the exposure condition. For example, when the exposure condition is set such that the brightness of an object corresponds to a proper exposure, as shown by (13) illustrated in FIG. 21A, only LV images with brightness corresponding to the proper exposure are displayed on the display unit 1126. Moreover, when the exposure condition is set such that the brightness of an object corresponds to an exposure on the underside, as shown by (23) illustrated in FIG. 21A, LV images corresponding to the exposure on the underside is displayed on the display unit 1126.

Next, a case in which the alternate display setting is OFF and the exposure simulation setting is OFF will be described. In this case, since the alternate display setting is turned off, as shown by (14) illustrated in FIG. 21A, still images (third image) for display are not displayed on the display unit 1126 (it is illustrated by a dotted line in FIG. 21A). Then, since the exposure simulation setting is turned off, as shown by (24) in FIG. 21A, LV images corresponding to appropriate brightness (exposure) giving priority to the visibility of a user are displayed on the display unit 1126, regardless of the exposure condition.

Here, processing in the case in which the alternate display setting is ON and the exposure simulation setting is OFF will be described with reference to FIG. 21B. FIG. 21B is a diagram which illustratively describes an alternate display in the case in which the alternate display setting is ON and the exposure simulation setting is OFF. In this setting, normally, when still images for display are generated, gain adjustment is performed according to LV images acquired immediately before. However, as shown in (22') of FIG. 21B, if the exposure condition set by a user is the exposure on the underside, still images have brightness corresponding to an exposure on the underside, LV images have brightness corresponding to a proper exposure giving priority to visibility. Therefore, if these images are alternately displayed, images with different brightness (no continuity) are alternately displayed, and thus the sense of discomfort given to a user is large. Therefore, in this embodiment, if the alternate display setting is ON and the exposure simulation setting is OFF, the brightness of images for an alternate display are adjusted in the same manner as in the case in which the alternate display has priority and the exposure simulation setting is ON (for example, (21) of FIG. 21B and the like). On the other hand, in order to give priority to the exposure simulation setting, the images used for the alternate display may be selected in the same manner as in the case in which the alternate display setting is turned off ((24) of FIG. 21B and the like).

Next, the details of the generation and display processing of LV images (second image) according to the present embodiment will be described with reference to FIG. 22. FIG. 22 is a flowchart which describes the generation and display processing of LV images according to the fourth embodiment of the present invention. In the following description, description will be provided assuming an $n^{th}$ (n is a natural number) imaging operation corresponding to the second and subsequent imaging operations in continuous photographing. A basic processing flow in the present embodiment is substantially the same as that in the third embodiment (FIG. 13) described above, and only the processing (FIG. 22) related to the generation and display of the second image and the processing (FIG. 23) related to the generation and display of the third image are different from in the third embodiment described above. Hereinafter, differences from the above-described third embodiment will be described.

The processing from S1801 to S1802 is the same as that of S801 to S802 of the third embodiment, and thus the description thereof will be omitted. If it is determined that an alternate display flag is one in S1802, the procedure proceeds to the processing of S1803, and, if it is determined that an alternate display flag is not one (that is, an alternate display flag is zero) in S1802, the procedure proceeds to S1806.

The camera MPU 1125 determines whether the exposure simulation setting is ON in S1803. The camera main body 1120 of the present embodiment can switch ON or OFF of the exposure simulation setting arbitrarily by a user operating the operation switch group 1127 or the like. If it is determined that the exposure simulation setting is ON in S1803, the procedure proceeds to S1804, and the camera MPU 1125 performs editing setting of the second image (n) that is an LV image used for an alternate display. The processing of S1804 is performed to generate LV images according to the exposure condition set by a user, and to use the LV images for an alternate display. Therefore, using the exposure conditions obtained in S1801, the camera MPU 1125 performs the editing setting of LV images (second image (n)) such that the difference between the second image (n) and the third image (n−1) acquired (generated) immediately before decreases. The details of the editing setting are the same as those of the third embodiment described above, and thus the description thereof will be omitted.

If it is determined that the exposure simulation setting is OFF in S1803, the procedure proceeds to S1805, the camera MPU 1125 proceeds to S1804, and the camera MPU 1125 performs the editing setting of the second image (n) which is the LV image used for an alternate display. Since the exposure simulation setting is turned off in the processing of S1805, the editing setting of LV images is performed such that the brightness of an object becomes brightness corresponding to the proper exposure in consideration of the visibility of a user. If an alternate display is performed and the exposure simulation setting is turned off, the brightness of the still images for display is adjusted according to LV images in the generation and display processing of the third image to be described below. Therefore, the editing setting in this timing may be a setting for adjusting to the brightness considering the visibility of a user as LV images. In addition, information on proper exposure is assumed to be stored in memory 1128 or the like in advance.

Next, a case in which it is determined that the alternate display flag is not one in the processing of S1802 will be described. Since the processing in S1806 is substantially the same as the processing in S1803, the description thereof will be omitted. If it is determined that the exposure simulation setting is ON in S1806, the procedure proceeds to S1807, and the camera MPU 1125 performs the editing setting of an LV image for display (second image (n)) in the case in which still images are not displayed on the display unit 1126. In the processing of S1807, since a third image (still images for recording (n−1)) acquired immediately before is not used for a display, editing setting is performed such that only the LV image (n) has brightness in accordance with an exposure condition set in advance. For example, at the time of continuous photographing, the editing setting is performed on LV images according to the exposure condition at the time of acquiring still images for recording (first image). In the present embodiment, in particular, gain adjustment is performed according to an exposure condition, and thereby LV images are set to a desirable brightness, but the brightness of LV images in accordance with the exposure condition may be realized by adjusting other parameters.

If the exposure simulation setting is OFF in S1806, the procedure proceeds to S1808, and the camera MPU 1125 performs editing setting of the LV image for display (second image (n)) in the case in which still images are not displayed on the display unit 1126. In this case, it is unnecessary to adjust the LV image to the brightness in accordance with an exposure condition (for example, still images for recording), unlike the processing of S1807 described above, and editing setting is performed such that the brightness of the LV image is set to brightness suitable for a display onto the display unit 1126. The subsequent processing of S1809 to S1812 is substantially the same as the processing of S805 to S808 in the third embodiment described above, and thus the description thereof will be omitted.

Next, the details of the generation and display processing of a still image for display (third image) according to the present embodiment will be described with reference to FIG. 23. FIG. 23 is a flowchart which describes the generation and display processing of a still image for display according to the fourth embodiment of the present invention. In the present embodiment, as described above, the editing setting of an LV image is performed such that the LV image has brightness close to the brightness of a still image for recording, but a case in which the ease of a photographing operation has priority and the editing setting of a still image for display (n) is performed so as to match the LV image (n) will be described.

Since the processing of S1901 is the same as the processing of S701 of the third embodiment described above, the description thereof will be omitted. Next, the camera MPU 1125 determines whether the exposure simulation setting is turned on by a user in S1902. If it is determined that the exposure simulation setting is ON in S1902, the procedure proceeds to S1903, and the camera MPU 1125 performs editing setting for a still image for display (third image (n)) used for an alternate display.

In the processing of S1903, to execute exposure simulation, a still image for display (n) is acquired so as to have brightness corresponding to the exposure condition of a previously acquired still image for recording (n), and the still image for display is used for an alternate display. Therefore, the camera MPU 1125 performs the editing setting on the still image for display (third image (n)) such that a difference from an LV image (n) which has brightness in accordance with the exposure condition obtained in S1901 and is acquired (generated) immediately before decreases. If the exposure simulation setting is turned on, the brightness of an LV image is adjusted according to a still image, and thus the editing setting for a still image may be set to an editing setting based only on the exposure condition set by a user regardless of the brightness of an LV image immediately before.

If it is determined that the exposure simulation setting is OFF in S1902, the procedure proceeds to S1904, and the camera MPU 1125 performs an editing setting on a still image for display (third image (n)) used for an alternate display. Since the exposure simulation is not executed in the processing of S1904, the still image for display (third image (n)) is acquired according to the exposure condition set by a user, and the still image for display is used for an alternate display. Therefore, the camera MPU 1125 performs an editing setting on the still image for display (third image (n)) such that a difference from an LV image (n) acquired (generated) immediately before decreases, regardless of the exposure condition acquired in S1901. As the editing setting, for example, gain adjustment is performed when a stilt image for display is acquired in accordance with the brightness of an LV image. That is, when an alternate display is executed and exposure simulation is not executed, the brightness of still images is adjusted in accordance with the brightness of an LV image acquired (or displayed) immediately before. Since the processing of S1905 to S1908 after photographing is substantially the same as the processing of S1103 to S1106 of the third embodiment described above, the description thereof will be omitted.

As described above, the camera main body 1120 according to the present embodiment has a configuration in which each image is acquired such that a difference between images used for an alternate display decreases regardless of the presence or absence of exposure simulation. For example, if the exposure simulation setting is ON, the brightness of an LV image is adjusted on the basis or the exposure condition set by a user. In addition, if the exposure simulation setting is turned off, the visibility of a user has priority and the brightness of still images is adjusted in accordance with the brightness of an LV image. With this configuration, it is possible to reduce that images having different brightness are continuously displayed in an alternate display. Therefore, the camera main body 1120 of this embodiment can suppress an image displayed on the display unit 1126 from becoming unnatural and decrease the sense of discomfort given to a user, according to an alternate display-related setting and an exposure simulation setting.

In the embodiments described above, when the alternate display setting is turned on and the exposure simulation setting is turned off, adjusting the brightness of a still image in accordance with an LV image has been mentioned, but the present invention is not limited thereto. For example, since there is a large calculation load in performing brightness adjustment (for example, gain adjustment and image processing) on a high resolution image having a small amount of pixel thinning like a still image, in this case, the camera MPU 1125 may be controlled so as not to perform an alternate display.

In addition, the field of view range may be adjusted in addition to the brightness in the case in which a still image is adjusted in accordance with an LV image. Electronic hand shake correction and the like are often performed in the LV display, and thus it may be narrower than the field of view range of a still image. In such a case, it is preferable to adjust a still image in accordance with the field of view range of an LV image.

Although the preferred embodiments of the present invention have been described above, the present invention is not limited thereto, and various modifications and changes are possible within the scope of the gist thereof. For example, in the embodiments described above, an example in which focus detection is performed using an LV image has been shown, but the second image is not limited to the LV image. For example, if an LV image and an image used for focus detection are separately acquired, both the LV image and the image for focus detection correspond to the second image. In addition, if the LV display is not performed before the imaging start of a still image, when an alternate display is executed during the continuous shooting of an object, an image for focus detection and a still image which are not used as an LV image may be used for an alternate display.

Moreover, in the embodiments described above, a so-called lens exchange type imaging apparatus in which a lens unit can be attached to and detached from the camera main body 1120 has been described, but the present invention is not limited thereto. For example, even if a lens fixed type imaging apparatus in which a camera main body and a lens unit are integrally formed is adopted, the configuration of the present invention described above can be adopted.

Further, in the embodiments described above, a case in which a digital camera is adopted as an example of the imaging apparatus for implementing the present invention has been described, but the present invention is not limited thereto. For example, an imaging apparatus other than a digital camera like a portable device such as a digital video camera or a smart phone, or a security camera may be adopted.

OTHER EMBODIMENTS

The invention provides a program implementing one or more of the functions of the above described embodiments to a system or device via a network or storage medium, and can be realized in processing of reading and executing, by one or more processors in the system or the computer of the apparatus, the program. Further, it can also be realized by a circuit (for example, ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-062852 filed on Mar. 28, 2017, No. 2017-217626 filed on Nov. 10, 2017, No. 2017-217627 filed on Nov. 10, 2017, and No, 2018-012590 filed on Jan. 29, 2018, which are hereby incorporated by reference herein in its entirety.

What is claimed is:

1. An imaging apparatus that images an object through an imaging optical system, the imaging apparatus comprising:
   an imaging element which acquires image signals from light imaged by the imaging optical system;
   a controller having a processor which executes instructions stored in a memory or having circuitry, the controller being configured to function as
   a first control unit configured to control a driving of the imaging element so that outputting a first image corresponding to pixel portions of a number of first pixels and a second image corresponding to pixel portions of a number of second pixels smaller than the number of first pixels among pixel portions of the imaging element; and
   a second control unit configured to perform displaying an image on a display unit,
   wherein, when a continuous shooting which performs continuously obtaining of the first image is performed, the second control unit is able to control so that perform displaying an image on the display unit by a first displaying method which is displaying alternately a third image which is generated based on the first image, and the second image, and
   wherein, in a case where displaying an image on the display unit by the first displaying method, the second control unit controls displaying the third image and the second image on the display unit such that a difference between the third image and the second image is reduced.

2. The imaging apparatus according to claim 1,
   wherein, in a case where displaying an image on the display unit by the first displaying method, the second control unit controls at least one of an exposure conditions related to an exposure parameters or a blur information related to shake information and contrast information of the object of an image such that a difference between the third image and the second image is reduced.

3. The imaging apparatus according to claim 1,
   wherein the second control unit is able to control so that perform displaying an image on the display unit by a second displaying method which is displaying alternately the third image and a fourth image which is combined the third image and the second image on the display unit.

4. The imaging apparatus according to claim 3, further comprising:
   a determination unit configured to determine a displaying method on the display unit when the continuous shooting is performed,
   wherein the determination unit determines whether to display an image by the first displaying method or the second displaying method on the basis of predetermined information on the first image or the second image or the third image.

5. The imaging apparatus according to claim 4,
   wherein the predetermined information is at least one of light emission amount of a light emitting device at the time of acquiring the first image, a difference between an exposure of the first image or the third image and the second image, a focus detection result at the time of acquiring the second image, presence or absence of emission of an auxiliary light related to focus detection at the time of acquiring the second image, and presence or absence of flicker detection in a light source.

6. The imaging apparatus according to claim 2,
   wherein the first image is a still image for recording,
   the second image is a live view image used for live view, and
   the third image is a still image for displaying which is generated based on the first image.

7. The imaging apparatus according to claim 6,
   wherein the second control unit sets the exposure parameters such that a condition for acquiring the first image has priority.

8. The imaging apparatus according to claim 1,
   wherein the imaging element includes a plurality of microlenses and a plurality of photoelectric conversion units corresponding to each microlens.

9. A control method of an imaging apparatus that images an object through an imaging optical system, the control method comprising:
   acquiring image signals from light imaged by the imaging optical system using an imaging element;
   a first control step of controlling a driving of the imaging element so that outputting a first image corresponding to pixel portions of a number of first pixels and a second image corresponding to pixel portions of a number of second pixels smaller than the number of first pixels among pixel portions of the imaging element; and
   a second control step of performing displaying an image on a display unit,
   wherein, when a continuous shooting which performs continuously obtaining of the first image is performed, at the second control step the display unit is able to display an image by a first displaying method which is displaying alternately a third image which is generated based on the first image, and the second image, and
   wherein, in a case where displaying an image on the display unit by the first displaying method, at the second control step the display unit displays the third image and the second image such that a difference between the third image and the second image is reduced.

10. The imaging apparatus according to claim 2,
    wherein the exposure parameters include at least one of an aperture value, sensitivity, and exposure time.

* * * * *